United States Patent
Choong et al.

(10) Patent No.: US 8,370,483 B2
(45) Date of Patent: *Feb. 5, 2013

(54) NETWORK ANALYSIS SYSTEM AND METHOD

(75) Inventors: Jason Yew Choo Choong, San Jose, CA (US); Gregory Joseph Barron, Thornbury (AU); Peter Graeme Cobb, Wonga Park (AU); William Raymond Wood, South Yarra (AU); Dean van Gerrevink, Hawthorn (AU)

(73) Assignee: Daintree Networks, Pty. Ltd., Scoresby, VIC (AU)

( * ) Notice: Subject to any disclaimer, the term of this patent is extended or adjusted under 35 U.S.C. 154(b) by 391 days.

This patent is subject to a terminal disclaimer.

(21) Appl. No.: 12/702,034

(22) Filed: Feb. 8, 2010

(65) Prior Publication Data

US 2010/0135186 A1  Jun. 3, 2010

Related U.S. Application Data

(63) Continuation of application No. 11/338,532, filed on Jan. 24, 2006, now Pat. No. 7,660,892.

(60) Provisional application No. 60/646,687, filed on Jan. 24, 2005.

(51) Int. Cl.
*G06F 15/173* (2006.01)

(52) U.S. Cl. ........................................... 709/224
(58) Field of Classification Search .................... 709/224
See application file for complete search history.

(56) References Cited

U.S. PATENT DOCUMENTS

| | | | |
|---|---|---|---|
| 5,142,550 A | 8/1992 | Tymes | |
| 5,870,559 A | 2/1999 | Leshem et al. | |
| 5,954,835 A | 9/1999 | Higginson et al. | |
| 6,067,574 A | 5/2000 | Tzeng | |
| 6,105,065 A | 8/2000 | Rao et al. | |
| 6,115,393 A | 9/2000 | Engel et al. | |
| 6,137,782 A * | 10/2000 | Sharon et al. | 370/255 |
| 6,144,962 A | 11/2000 | Weinberg et al. | |
| 6,237,006 B1 | 5/2001 | Weinberg et al. | |
| 6,341,310 B1 | 1/2002 | Leshem et al. | |
| 6,470,383 B1 | 10/2002 | Leshem et al. | |
| 6,549,208 B2 | 4/2003 | Maloney et al. | |
| 6,549,944 B1 | 4/2003 | Weinberg et al. | |
| 6,571,272 B1 | 5/2003 | Ferguson et al. | |
| 6,697,337 B1 | 2/2004 | Cafarelli et al. | |
| 6,700,871 B1 | 3/2004 | Harper et al. | |
| 6,714,217 B2 | 3/2004 | Huang et al. | |
| 6,833,850 B1 | 12/2004 | Arquie et al. | |
| 6,879,812 B2 | 4/2005 | Agrawal et al. | |
| 6,900,822 B2 | 5/2005 | Germain et al. | |
| 7,171,476 B2 | 1/2007 | Maeda et al. | |

(Continued)

OTHER PUBLICATIONS

Estin, Deborah et al., "Network Visualization with Nam, the VINT Network Animator", IEEE, Nov. 2000, pp. 63-68.

(Continued)

*Primary Examiner* — Ryan Jakovac
*Assistant Examiner* — Bryan Lee
(74) *Attorney, Agent, or Firm* — Fish & Richardson P.C.

(57) ABSTRACT

A system for analyzing a packet-based network includes a wireless network analysis processing device that is configured to receive correlated packet records representative of the order in which corresponding packets are transmitted in a wireless network. The correlated packet records include media access control (MAC) layer data and network layer data for each corresponding packet. The MAC layer data and network layer data are processed to generate network topology data representative of the network topology, generate packet flow data representative of the flow of packets between devices at the MAC layer and across the network at the network layer, and measurement data relating to the packet flow data.

12 Claims, 30 Drawing Sheets

U.S. PATENT DOCUMENTS

| | | | |
|---|---|---|---|
| 7,177,930 B1* | 2/2007 | LoPresti | 709/224 |
| 7,203,173 B2 | 4/2007 | Bonney et al. | |
| 7,363,398 B2 | 4/2008 | Scott | |
| 7,792,956 B2 | 9/2010 | Choong et al. | |
| 7,962,606 B2 | 6/2011 | Choong et al. | |
| 2002/0015485 A1* | 2/2002 | Bhusri | 379/220.01 |
| 2002/0145981 A1 | 10/2002 | Klinker et al. | |
| 2002/0196748 A1 | 12/2002 | DeMier | |
| 2003/0020764 A1 | 1/2003 | Germain et al. | |
| 2003/0081125 A1 | 5/2003 | Sheldon et al. | |
| 2003/0206559 A1 | 11/2003 | Trachewsky et al. | |
| 2004/0030741 A1 | 2/2004 | Wolton et al. | |
| 2004/0046786 A1 | 3/2004 | Tanimoto | |
| 2004/0143658 A1 | 7/2004 | Newton et al. | |
| 2004/0193329 A1 | 9/2004 | Ransom et al. | |
| 2004/0218602 A1 | 11/2004 | Hrastar | |
| 2005/0021683 A1 | 1/2005 | Newton et al. | |
| 2005/0039132 A1 | 2/2005 | Germain et al. | |
| 2005/0047333 A1 | 3/2005 | Todd et al. | |
| 2005/0050098 A1 | 3/2005 | Barnett | |
| 2005/0071456 A1* | 3/2005 | Adda et al. | 709/224 |
| 2005/0180447 A1 | 8/2005 | Lim et al. | |
| 2005/0228880 A1 | 10/2005 | Champlin | |
| 2005/0232230 A1 | 10/2005 | Nagami et al. | |
| 2005/0278437 A1* | 12/2005 | Xie et al. | 709/223 |
| 2005/0278440 A1 | 12/2005 | Scoggins | |

OTHER PUBLICATIONS

Lentz, Chris, "802.11b Wireless Network Visualization and Radiowave Propagation Modeling", Dartmouth College Technical Report TR2003-451, Jun. 1, 2003, pp. 1-19.

Huffaker, Bradley et al., "Otter: A General-Purpose Network Visualization Tool", retrieved on Jan. 10, 2006 at http://www.isoc.org/inet99/proceedings/4h/4h_3.htm (24 pp.).

Angela Orebaugh, Ethereal Packet Sniffing, 2004 (May 6, 2004), Syngress Publishing, Inc., pp. 126-128, 144 and 149, 8 pages.

Sinem Coleri Ergen, Zigbee/IEEE 802.15.4 Summary, Sep. 10, 2004, 1 page.

Notification of Transmittal of the International Search Report and the Written Opinion of the International Searching Authority, PCT/US06/02367, Sep. 25, 2007, 12 pages.

Notification Concerning Transmittal of International Preliminary Report on Patentability, PCT/US06/02367, Nov. 1, 2007, 9 pages.

* cited by examiner

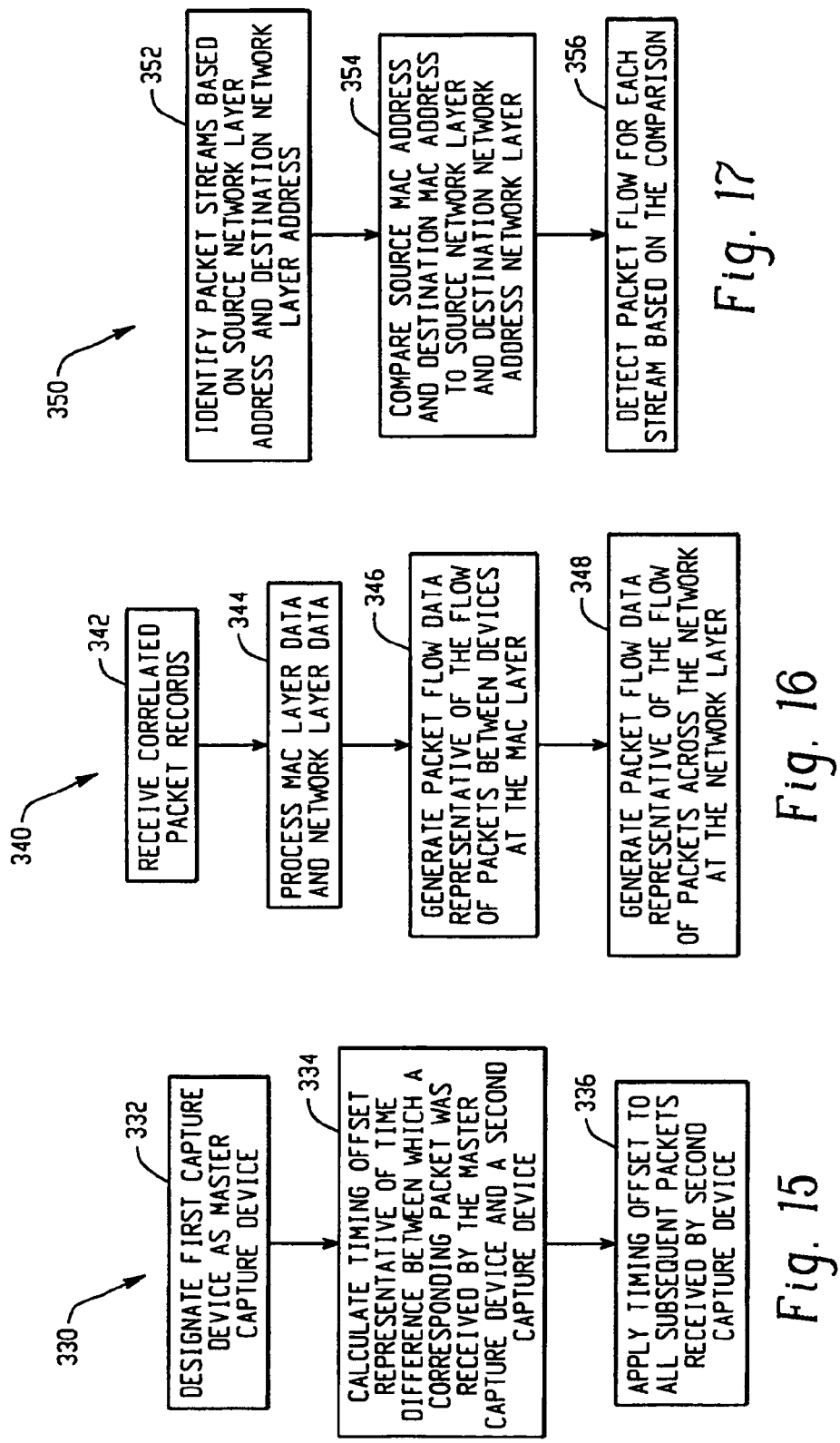

| Measurements | | | | | | | | | |
|---|---|---|---|---|---|---|---|---|---|
| PAN:ShortAddr (LongAddr) | ReTx Ratio | Rssi Min | Rssi Avg | Rssi Max | Uni Tx | Uni Rx | Uni Loss | Bcst MAC | Bcst NWK (Tot) |
| 0001:0000 (0012460000000011) | 0.0333 | 255 | 255.0000 | 255 | 57 | 47 | 0.0000 | 1 | 1 |
|   0002 | | | | | 15 | 15 | | | |
|   SUCCESSFUL | | | | | | | | | |
|     0000:0001:0002 | | | | | | | | | |
|   ENDPOINTS | | | | | | | | | |
|     00/00 ZigBee Device Profile 0x0000 | | | | | | | | | |
|       End_Device_Bind_rap_0xa0 | | | | | | | | | |
|   0000 | | | | | | | | | |
|   SUCCESSFUL | | | | | | | | | |
|     0000:0020 | | | | | | | | | |
|   ENDPOINTS | | | | | | | | | |
|     00/00 ZigBee Device Profile 0x0000 | | | | | | | | | |
|       End_Device_Bind_rap 0x0100 | | | | | | | | | |
|     --/01 HCL Profile 0x01 | | | | | | | | | |
|       OnOfDRC 0x01 | | | | | | | | | |
| 0001:0001 (0002010000000000) | 0.0000 | 255 | 255.0000 | 255 | 30 | 20 | 0.0000 | 3 | 1 |
|   0001:0020 (17161514131200007) | 0.0000 | 255 | 255.0000 | 255 | 33 | 28 | | 3 | 1 |
|   SUCCESSFUL | | | | | 26 | 28 | | | |
|     0020:0000 | | | | | | | | | |
|   ENDPOINTS | | | | | | | | | |
|     00/00 ZigBee Device Profile 0x0000 | | | | | | | | | |
|       End_Device Bind rap 0x20 | | | | | | | | | |
|     01/02 HCL Profile 0x0100 | | | | | | | | | |
|       OnOfDRC 0x01 | | | | | | | | | |
|       DimBrightDRC 0x02 | | | | | | | | | |
| 0001:0002 (17161514131200007) | 0.0000 | 255 | 255.0000 | 255 | 17 | 16 | 0.0000 | 3 | 1 |
|   0000 | | | | | 15 | 15 | | | |
|   SUCCESSFUL | | | | | | | | | |
|     0002:0001:0000 | | | | | | | | | |
|     0002:0000 | | | | | | | | | |
|   ENDPOINTS | | | | | | | | | |

NETWORK ANALYSIS SYSTEM AND METHOD

This application is a continuation of U.S. patent application Ser. No. 11/338,532, filed on Jan. 24, 2006 and which issued as U.S. Pat. No. 7,660,892 on Feb. 9, 2010, which claims the benefit of priority to U.S. Provisional Application Ser. No. 60/646,687, entitled "Multi-Point Analysis And Visualization Of Wireless Mesh Networks," filed on Jan. 24, 2005. The entire disclosures of application Ser. Nos. 11/338, 532 and 60/646,687 are incorporated herein by reference.

BACKGROUND AND SUMMARY

This disclosure generally relates to network analysis systems, and in particular relates to wireless mesh network analysis systems and methods.

Wireless mesh networking is an emerging technology for enabling wireless interconnections between a variety of devices, such as sensors, actuators, switches, communication devices, and other network devices. The network devices may be implemented to support a variety of applications, such as home automation, building and industrial automation, environmental monitoring, data communication, etc.

Wireless mesh networks typically implement a dynamic topology in which devices are associated and disassociated with other devices in the network and in which the roles and responsibilities of such devices may change over time. Thus there are unique challenges to developing, deploying and managing wireless networks.

Disclosed herein is a novel network analysis system and method that facilitates the capturing of network data for analysis, measurement, and visualization. The capturing of network data may be implemented in-band or out-of-band from the network. Captured network data may be analyzed in real time or stored for later analysis. Measurements obtained from the analysis may relate to network performance, device performance, route performance, or other network characteristics. The topology of the network may be graphically displayed, and measurement data may be accessible via the graphical display of the network topology.

In one embodiment, a system for analyzing a packet-based network includes a correlator processor that is configured to receive packet records corresponding to packets communicated over a network and store the packet records in a data store. The correlator processor is also configured to generate correlated packet records from the packet records stored in the data store, the correlated packet records representative of the order in which the packets were transmitted in the network.

In another embodiment, a system for analyzing a packet-based network includes a wireless network analysis processing device that is configured to receive correlated packet records representative of the order in which corresponding packets are transmitted in a wireless network. The correlated packet records include media access control (MAC) layer data and network layer data for each corresponding packet. The MAC layer data and network layer data are processed to generate network topology data representative of the network topology, generate packet flow data representative of the flow of packets between devices at the MAC layer and across the network at the network layer, and measurement data relating to the packet flow data.

In another embodiment, a system for analyzing a packet-based network includes a packet-based wireless network visualization system. The packet-based wireless network visualization system includes a data store, an input/output subsystem including a display device, and a processing subsystem. The system is configured to receive network topology data, packet flow record data, and measurements data over the input/output subsystem and store the network topology data, packet flow record data, and measurements data in the data store. Based on the stored data, the system generates a visual representation of a network topology on the display based on the network topology data, generates a visual representation of packet flows within the network topology based on the packet flow records, and selectively displays measurement data related to the packet flows and network topology based on the measurements data. The visual representation of the network topology includes device objects, associations of device objects and a plurality of layer representations.

In another embodiment, a system for analyzing a packet-based network includes a plurality of capture devices configured to monitor packets communicated over the network and create the corresponding packet records. Each capture device includes a capture clock and each capture device is further configured to include a timestamp in each packet record corresponding to the capture clock time the capture device detects the start of frame of a packet. In one embodiment, the capture devices may communicate with a correlator processor in-band over the wireless network being observed. In another embodiment, the capture devices may communicate with a correlator processor out-of-band over another data network, e.g. a local area network (LAN). In another embodiment, the capture devices may simultaneously perform an active network device role and perform a passive sniffing role to capture network data.

DRAWINGS

FIG. 15 is a flow diagram of an example process of timestamp synchronizing packet records.

FIG. 16 is a flow diagram of an example process of generating packet stream data and packet flow data.

FIG. 17 is a flow diagram of an example process of detecting packet flow for a stream.

FIG. 35 is an example measurements window for providing information on the states of devices, streams and routes.

FIG. 39 is an example APS binding context menu.

FIG. 40 is an example APS cluster context menu.

FIG. 41 is an example Expand context menu.

DETAILED DESCRIPTION

Figure 1:
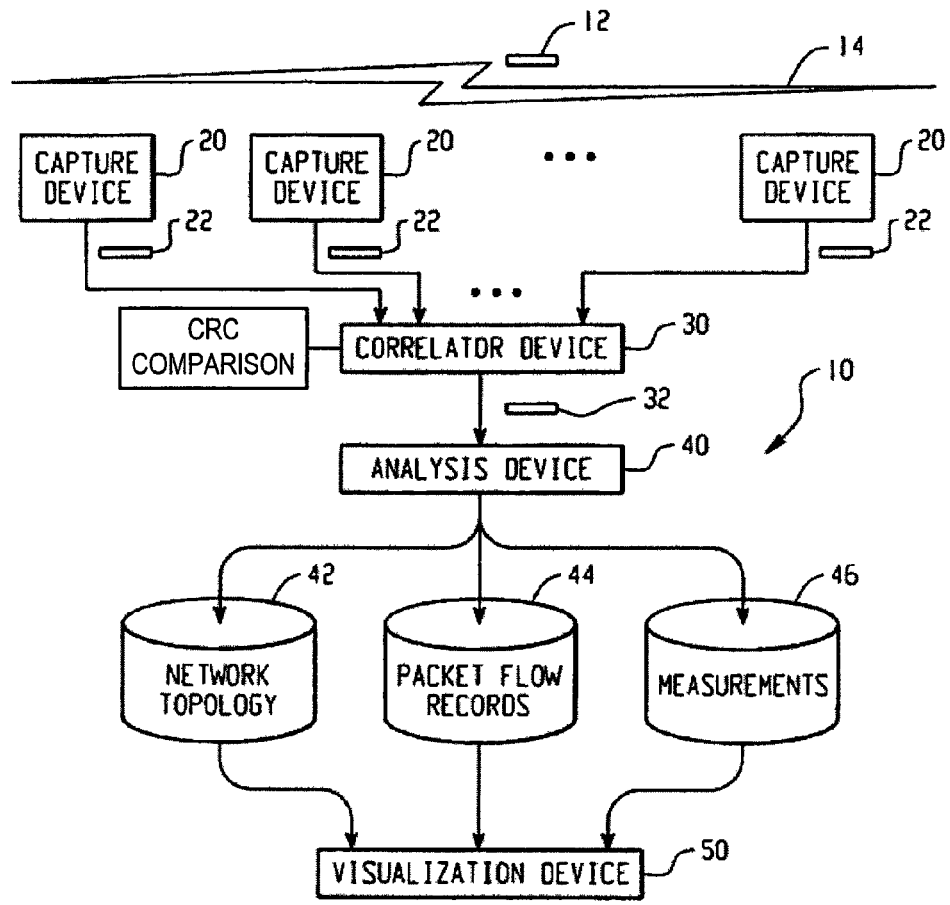
FIG. 1 is a block diagram of an example network analysis system.

FIG. 1 is a block diagram of an example network analysis system 10. The network analysis system 10 includes one or more capture devices 20, a correlator device 30, an analysis device 40, and a visualization device 50. The capture devices 20 capture packets 12 communicated over a wireless link 14 in a wireless network. The packets 12 are processed into packet records 22 that are provided to the correlator 30. The correlator 30, in turn, processes the packet records 22 and generates correlated packet records 32 that are provided to the analysis device 40. The analysis device 40 processes the stream of correlated packet records 32 to create network topology data 32, packet flow records 44 and measurements data 46. The network topology data 32, packet flow records 44 and measurements data 46 are accessed by a visualization device 50 to create a visual representation of the network and facilitate network analysis.

The correlator device 30, analysis device 40, and visualization device 50 may be implemented by executing software instructions on a single computer or on one or more computers in data communication over a network. Alternatively, specially designed hardware and/or software may be used to implement one or more of the correlator device 30, analysis device 40, and visualization device 50. Other hardware and/or software implementations may also be used.

Network device transmissions over the wireless link 14 are bounded by a "personal operating space," i.e., a device range. Network device transmissions from a given device will be detected by other network devices operating within that personal operating space. Similarly, a given network device will detect transmissions from other network devices within its own operating space. In one embodiment, the personal operating space of each network device in the network intersects with the personal operating space of at least one capture device 20. In one embodiment, the capture devices 20 are dedicated passive packet sniffer devices. In a different embodiment, the capture devices 20 may be integrated into active network devices and simultaneously perform an active network device role and a passive sniffing role to capture network data. The simultaneous role of the capture devices 20 provides for active interrogation of the network by the sensor analysis system 10 to facilitate network analysis.

In one embodiment, the network analysis system 10 of FIG. 1 may be used to passively monitor the flow of packets 12 through the wireless network. The packet records 22 may include a complete packet 12, or may only include a subset of a complete packet, e.g., header information, media access control (MAC) information, and network information.

The statistical nature of radio transmissions may cause a single capture device 20 to miss an occasional packet transmission. When more than one capture device 20 can detect a particular packet 12 transmitted from a network device, the probability of missing a packet transmission is reduced. The overlapping of personal operation spaces of the capture devices 22, however, may result in duplicate packet detections when a packet is detected at multiple capture devices 20. Thus the correlator 30 receives the packet records 22 and filters the packet records 22 of packet records 22 corresponding to duplicate packets 12 and/or retransmitted packets 12. Packet records 22 corresponding to duplicate packets 12, i.e., a packet that is detected at multiple capture devices 20, may be used to calibrate timestamp information from each capture device 20.

In one embodiment, the calibrated timestamps are used to generate the correlated packet records 32 that comprise the packet records 22 placed in the order that their corresponding packets 12 were detected by the capture devices 20. Accordingly, the correlated packet records 32 are representative of the order in which the packets were transmitted in the network. In another embodiment, the correlated packet records 32 need not be placed in the order that their corresponding packets 12 were detected by the capture devices 20; instead, the representative of the order in which the packets 12 were transmitted in the network may be recreated by indexing the timestamp of each packet record 22.

The analysis device 40 receives the correlate packet records 32 and processes the records 32 to generate the network topology data 32, packet flow records 44 and measurements data 46, which is, in turn, used to detect the topology of the wireless network and to identify packet paths and the nature thereof through the wireless network. Identified packet routes are used to generate statistics on the flow of packets through the network.

The visualization device 50 may generate a visual representation of the network. The discovered routes and streams may be visually represented on the graphical representation of the network topology. A stream comprises all packets transmitted at the network layer between two devices. A route comprises a unique sequence of nodes traversed by a given stream of packets. Hence a stream will be comprised of one or more routes. The packet routes may be shown as traversing devices in the wireless network, and may be classified as successful or failed routes to aid troubleshooting, network planning and installation.

Figure 2:
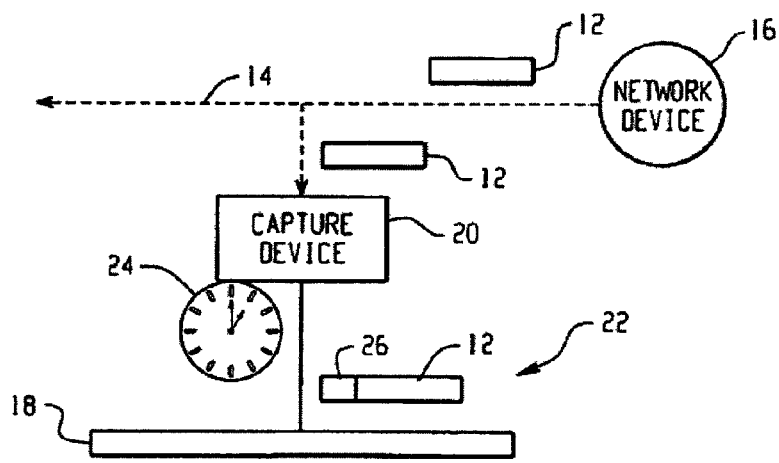
FIG. 2 is a block diagram of an example capture device.

FIG. 2 is a block diagram of an example capture device 20. Each capture device 20 includes a capture clock 24 that is used to generate timestamps. The capture clock 24 may comprise a system clock within the capture device 20. A timestamp is a numerical representation of the time that the start of frame of an incoming packet 12 transmitted by a network device 16 was detected by the capture device 20. As a frame radio signal is received by the capture device 20, it is converted into a binary bit stream and temporarily stored in a data store, such as a memory. As the capture device 20 detects the start of frame for an incoming packet 12, a timestamp is also generated and placed in the data store. When the frame has been completely received, a time-stamped packet record 22 is created. The packet record 22 may include the entire received packet 12 or a summary containing the particular packet 12 fields, such as MAC addresses and network address. In one embodiment, the packet record 22 includes the packet 12 and a timestamp 26.

In one embodiment, the capture clock 24 is a free-running independent clock and timestamp synchronization of packet records 22 is implemented in the correlator 30. In another embodiment, the capture devices 20 may communicate synchronization data to synchronize the capture clocks 24 in each capture device. In this embodiment, one capture device 20 may be designated a master capture device 20 and all other capture devices may calculate offsets or receive offsets to be added to their respective capture clocks 24 so that all capture clock 24 values are synchronized. The timestamp synchronization function may then be omitted from the correlator 30.

The timestamped packet records 22 are forwarded from the capture devices 20 to the correlator device 30. The capture devices 20 and the correlator device 30 may communicate in-band over the wireless network 14 or out-of-band over a separate network 18. An out-of-band network can be used to avoid traffic congestion that will modify the behavior of the network.

Figure 3:
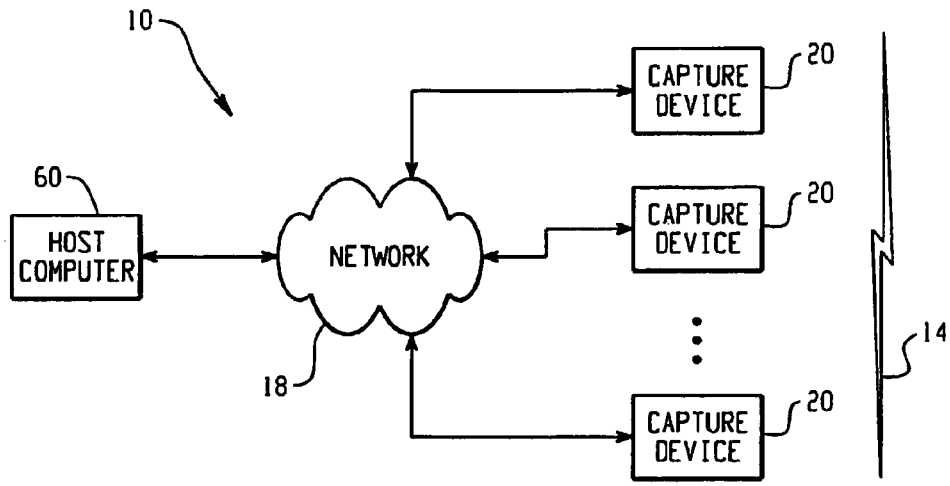
FIG. 3 is a block diagram of another embodiment of a network analysis system.

FIG. 3 is a block diagram of another embodiment of a network analysis system 10. In this embodiment, a host computer 60 implements the functionality of the correlator device 30, analysis device 40, and visualization device 50. The capture devices 20 communication with the host computer 60 via an out-of-band network 18, such as an Ethernet network.

Figure 4:
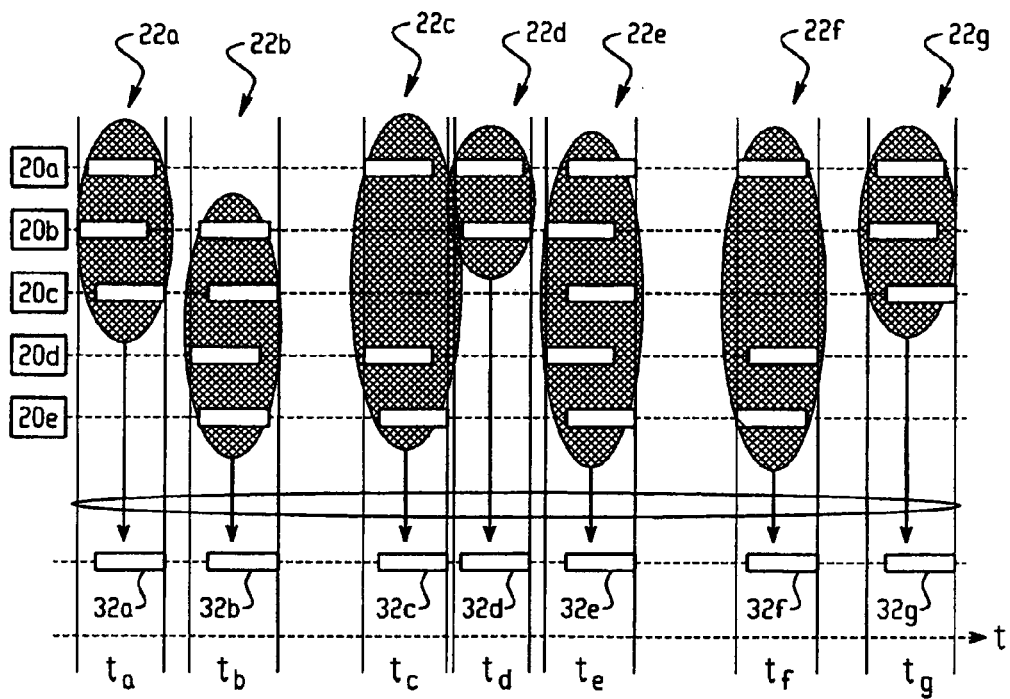
FIG. 4 is an illustration of a multi-point correlation and filtering of network communication data.

FIG. 4 is an illustration of a multi-point correlation and filtering of network communication data. Due to the overlapping of personal operating spaces of the capture devices 20, a packet 12 transmitted by a single network device 16 will be detected by multiple capture devices 20 and thus multiple corresponding packet records 22 may be transmitted to the correlator device 30 for the same packet 12. For example, in FIG. 4, capture devices 20a-20e selectively detect seven packets 12 transmitted during different time periods $t_a$-$t_g$. Thus duplicate packet records 22a-22g are generated during time periods $t_a$-$t_g$, i.e., packet records 22a comprise three duplicate packet records; packet records 22b comprise four duplicate packet records, etc. The correlator device 30 functions to detect the duplicate packet records 22a-22g and discards all but one of each duplicate packet record 22a-22g to construct correlated packet records 32a-32g representing packet transmissions by devices 16 in the network.

In one embodiment, the correlator device 30 also processes retransmitted packets by identifying and discarding retransmitted packets. Often transmitted packets may require acknowledgment by a receiving device, such as in the case in which a transmitting device inserts a flag in those transmitted packets that requires acknowledgment. Unacknowledged packets may be retransmitted a certain number of times or until an acknowledgment signal is received by the transmitting device.

To generate the correlated packet records 32, the correlator device 30 stores each packet record 22 received from each capture device 20 in a data store, such as a cache. When a new packet record 22 is received, it is checked to determine whether it has already been received from the same capture device 20 by comparing the received packet record 22 to packet records 22 stored in the data store. If it has already been received from the same capture device 20, the original received packet record 22 is marked as being subject to retransmission and the received packet record 22 is discarded. Packet records 22 may be compared by comparing the full contents of the packet record 22, or by comparing a subset of the packet record 22. The subset may be used to generate 16 or 32-bit cyclic redundancy checksum of the entire packet record 22, for example. Other comparison techniques may also be used.

If the packet record 22 does not correspond to a retransmitted packet 12, the packet record 22 is compared to packet records 22 stored in the data store to determine whether the packet record 22 has been received from another capture device 20. The same comparison techniques described above may be used in this comparison. If the packet record 22 has been received from another capture device 20, then the received packet record 22 is discarded, and the original received packet record 22 is designated as a duplicate packet record.

If a packet record 22 does not correspond to a duplicate packet 12 or a retransmitted packet 12, then the packet record 22 is stored in the data store as a new packet record 22.

Before duplicate packet records 22 are discarded, they are used to perform timestamp synchronization. The correlation device 30 first designates one capture device 20 as master timing capture device 20 for the purpose of synchronization. All other capture records 22 from other capture devices 20 are time synchronized to master timing capture device 20 as packet records 22 are received. As duplicated packet records 22 are received, a timing offset is calculated between the time the packet record 22 was received from the master timing capture device 20 and the unsynchronized capture device 20. An offset is calculated and stored for each capture device 20 and applied to all subsequent packet records 22 received from each capture device 20, respectively.

Once a capture device 20 has become synchronized, it may then be used to synchronize other capture devices 20. This facilitates packet records 22 from capture devices 20 that do not detect duplicate packets with the master timing capture device 20 to nevertheless become synchronized to the master timing capture device 20. The timing offsets may be adjusted with every duplicate packet record 22 detected.

Timestamp synchronization is not performed on packet records 22 that are classified as retransmissions. This avoids timestamp synchronization between an original packet record received 22 from a capture device 20 and a packet record 22 corresponding to a later retransmission of the packet 12 detected at another capture device 20.

The correlator device 30 uses the timing offsets to normalize the timestamps for all packet records 22 in the outgoing correlated packet records 32. The potential exists for packet records 22 to be received from multiple capture devices 20 out of the order from which they were actually transmitted. The normalized timestamps enable the correlator device 30 to reorder the packet records 22 in the outgoing packet stream to ensure they are forwarded to the analysis device 40 in the actual order they were transmitted. Reordering can be accomplished by storing packet records 22 intended for the outgoing correlated packet records 32 in a data store, such as a cache, for a time period before forwarding them to the analysis device 40. This time period may be selected based on the longest time possible for a packet 12 to be transmitted by a network device 16, detected by a capture device 20 and forwarded to the correlator device 30 for analysis. The time period is therefore dependent on the actual network under test and the specific implementation of the analysis system 10 and thus may be determined empirically.

The correlator device 30 thus produces correlated packet records 32 that comprise an ordered, time-stamped list of packet records 22 as detected across the wireless network, and free of packet records 22 corresponding to duplicate packets 12 or retransmissions of packets 12. The packet records 22 will appear in the ordered list, collected from different capture devices 20 in the network, in the order that their corresponding packets 12 were transmitted. Thus the correlator device 30 ensures that for a network layer packet 12 that traverses across multiple network devices 16, each hop of its path will be represented in the correct order in the correlated packet list 32. For example, for a packet sent from network device A to network device D and traversing hops from network device A to network device B to network device C to network device D, the correlated packet records 32 will comprise three packet records 22, one for each of the MAC layer segments from network devices A to B, B to C and C to D. The correlated packet records 32 will also be filtered of any packet records 22 corresponding to duplicate packets 12 or retransmitted packets 12.

Figure 5:
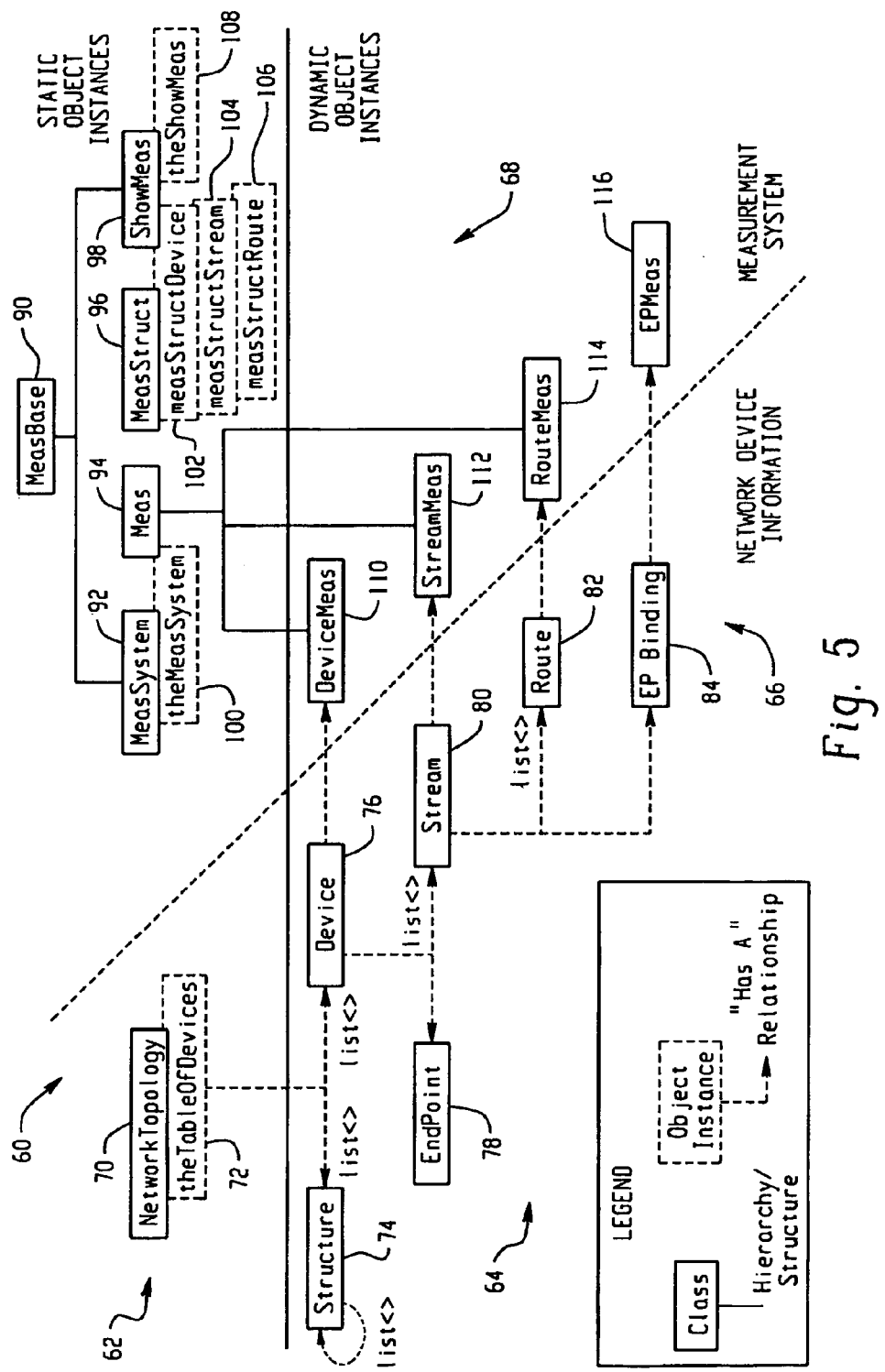
FIG. 5 is an illustration of an example analysis device data structure.
Figure 6:
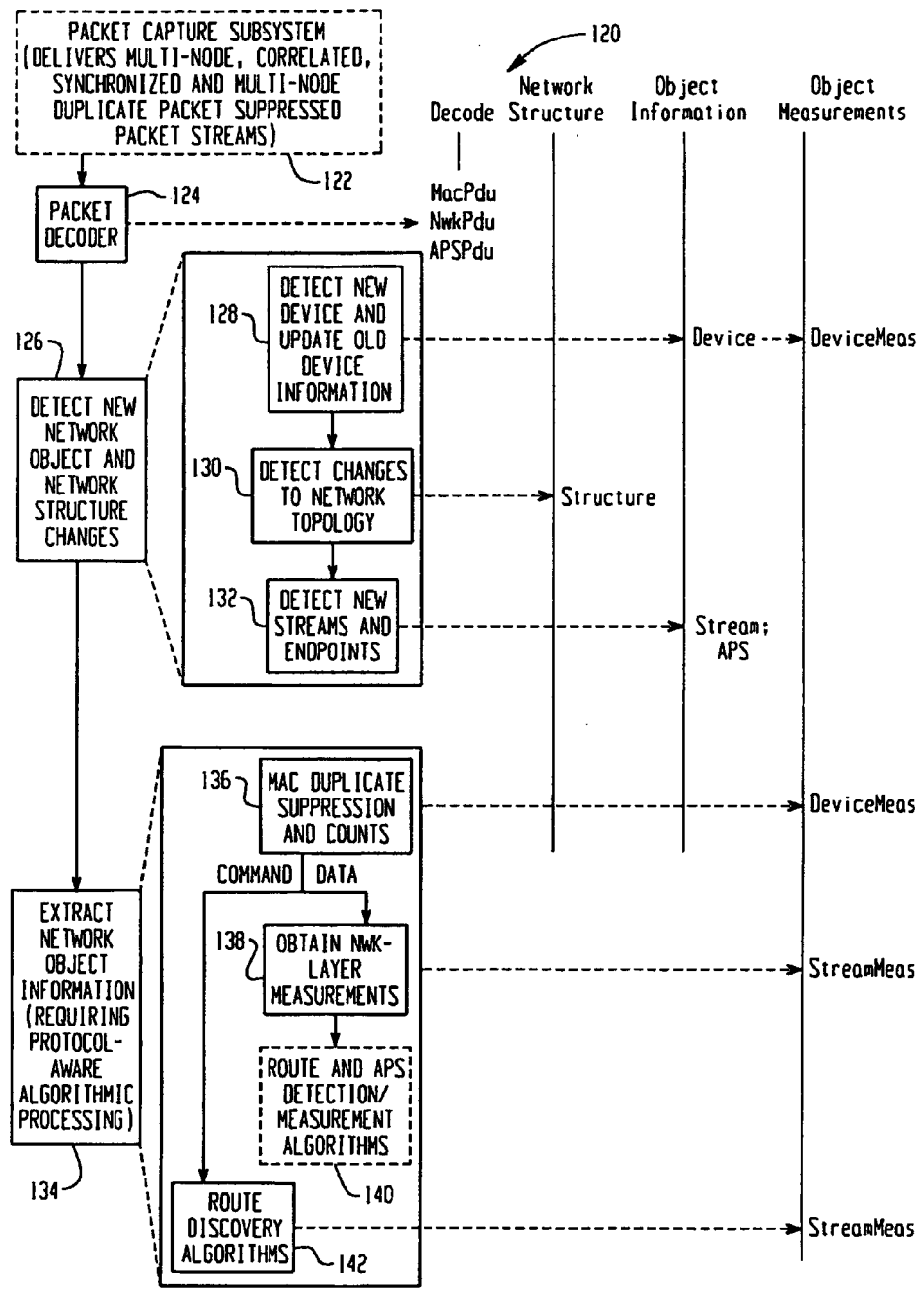
FIGS. 6-8 are example flow diagrams of network analysis device processes as used with the example analysis device data structure of FIG. 5.
Figure 7:
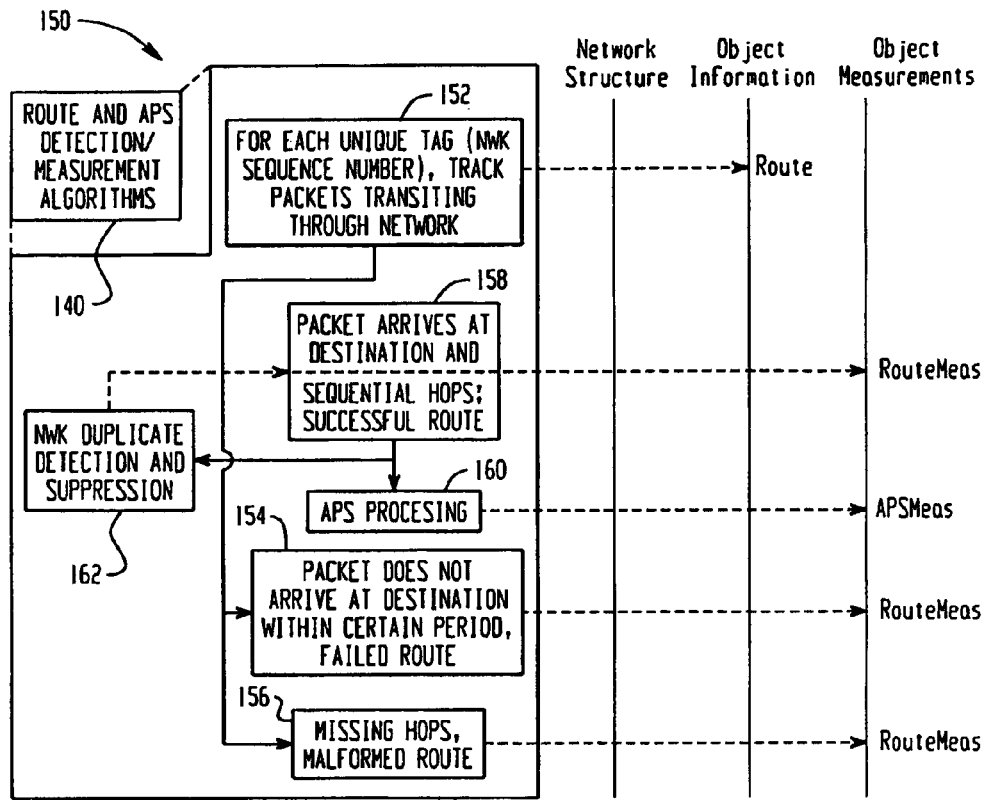
Figure 8:
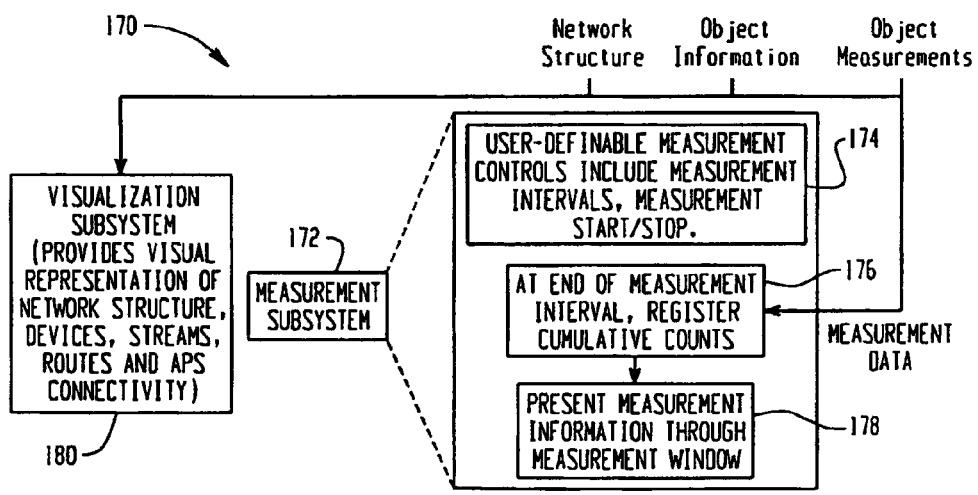

FIG. 5 is an illustration of an example analysis device data structure 60, and FIGS. 6-8 are example flow diagrams of network analysis device processes as used with the example analysis device data structure 60 of FIG. 5. The example analysis device data structure 60 of FIG. 5 and flow diagrams of FIGS. 6-8 are described with reference to an example embodiment that is utilized in an IEEE 802.15.4 and ZigBee compatible wireless network. In other embodiments, other wireless networks may be analyzed.

The analysis device data structure 60 defines static object instances 62 and dynamic object instances 64. The data structure 60 further defines network device information 66 and measurement information 68.

The network device information 66 comprises a hierarchical NetworkTopology class 70, Structure class 74, Device class 76, Endpoint class 78, Stream class 80, Route class 82 and EP Binding class 84 hierarchically arranged as shown in FIG. 5. An object instance TableOfDevices 74 is associated with the NetworkTopology class 70. The measurement information 68 comprises a hierarchical MeasBase class 90, MeasSystem class 92, Meas class 94, MeasStruct class 96, ShowMeas class 98, DeviceMeas class 110, StreamMeas class 112, RouteMeas class 114 and EPMeas class 116 hierarchically arranged as shown in FIG. 5. An object instance the MeasSystem 100 is associated with the MeasSystem class 92. Likewise, object instances measStructDevice 102, measStructStream 104 and measStructRoute 106 are associated with the MeasStruct class 96, and the object instance the ShowMeas 108 is associated with the ShowMeas class 98.

The packet capture subsystem block 122 of FIG. 6 generates the correlated packet records 32. The packet capture subsystem block 122 of FIG. 6 may be representative of the capture devices 20 and the correlator device 30. The analysis device 40 receives correlated packet records 32 from the correlator device 30. Each correlated packet record 32 is decoded to detect MAC, network and application layer information, as shown in step 124. The MAC layer information is used to detect changes to the network topology, and in particular detect new devices and/or associations between devices, as shown in step 126. The network layer information is used to detect the flow of packets through the wireless network and to create packet flow records. The decoded correlated packet records and packet flow records are then used in providing updates in the measurements data structures. Table 1 below provides an example list of decoded packet data.

TABLE 1

Example Decoded Packet Data

| Data | Description |
| --- | --- |
| Index | Index (sequence) number of the packet. The index is initialized to 1 at the beginning of a capture session. Indices are assigned sequentially to all packets received, and thus an index missing in the Packet List is indicative of a filter being applied. |
| Time | Time at which the packet was received, as provided by the capture device. The format is 'seconds.microseconds' where 'seconds' is the time in seconds since midnight, Jan. 1, 1970, and 'microseconds' is an offset in microseconds from this time. |
| Src PAN | The MAC Source PAN field. |
| Src | The MAC source address field. |
| Dest PAN | The MAC Destination PAN field. |
| Dest | The MAC destination address field. |
| MAC Seq No | The MAC Sequence Number. |
| NWK Src | The NWK source address field. |
| NWK Dest | The NWK destination address field. |
| NWK Seq No | The NWK Sequence Number. |
| APS Src EP | The APS Source Endpoint. |
| APS Dest EP | The APS Destination Endpoint. |
| APS Profile | The APS Profile ID. |
| APS Cluster | The APS Cluster ID. |
| AF Seq No | Application Frame Sequence number. |
| Protocol | The appropriate protocol layer corresponding to the packet. |
| Packet Type | The actual packet type. For example, ZigBee NWK layer packet types may be "Command" or "Data." |

Steps 128, 130 and 132 provide an example implementation of step 126. Step 128 detects new devices and updates existing device information based on the MAC, network and application layer information. Step 130 detects changes to the network topology based on the MAC, network and application layer information. Step 132 detects new streams and endpoints based on the MAC, network and application layer information.

In one example embodiment, the analysis device 40 detects nodes that are added to the network by detecting ASSOCIATION frames in which a new network device searches for associations. The first existing network device that receives and responds to the ASSOCIATION frames from the new network device becomes the parent of the new device and a new device association is formed. The analysis device 40 detects this exchange of packets and adds the new device and association to the NetworkTopology 70 data structure. The source and destination network layer addresses are used to identify a packet stream that represents the flow of packets between two devices in the network. The measurements data structure 96 maintains a list of all packet streams emanating from each device. When a new stream is detected, a new stream object 104 is added to the measurements data structure 96.

Step 134 extracts network object information. Step 134 typically involves a protocol-aware process, e.g., a process specific to a ZigBee network or 802.11 network, for example. Steps 136, 138, 140 and 142 provide an example implementation of step 134 for a ZigBee network. Step 136 determines MAC duplicate suppressions and counts based on packet data. Step 138 obtains network layer measurements. Step 140 executes route and application support layer detection algorithms and measurement algorithms, examples of which are provided in FIG. 7 below. Step 142 detects packet routes in the network based on command data.

In the example embodiment, the analysis device 40 collects MAC layer measurements for each device in the network. These measurements may include packet counts and received signal strength. For each stream, the analysis device 40 performs route detection to detect the routes taken by the flow of packets through the network, e.g., a sequence of hops taken by one or more packets. FIG. 7, below, provides an example route detection process. The path taken by a particular packet is captured in a packet flow record. Once all hops for a given packet flow have been detected, a packet flow record is complete and is added to a packet flow list.

The measurements data structure 96 is updated when a complete packet flow record is created. Each stream object 80 has one or more corresponding route objects 82 to represent the given path taken through the network. A complete packet flow record is therefore used to create a new route object 82 if one does not exist for the given path; otherwise, the packet flow record is used to update the measurements 114 for the corresponding route. For each route object 82, measurements may include statistics for packet counts and latency. The statistics are updated for each complete packet flow record. In one embodiment, the analysis device 40 utilizes a timer to indicate measurement intervals for accumulating, latching and reporting the measurements that are collected.

FIG. 7 is a flow diagram 150 of example route and application support layer detection algorithms and measurement algorithms. For each unique network sequence number, step 152 tracks packets transitioning through the network across multiple packets. Step 154 classifies a route as failed if a packet does not arrive at a destination within a time period. The time period may be determined by the particular parameters of a given network under test. Step 156 classifies a route as malformed if a route is determined to have missing hops. Step 158 classifies a route as successful if a packet arrives at a destination with all sequential hops. Step 162 performs network layer duplicate detection and suppression.

In the embodiment, the analysis device 40 determines the source and destination network layer addressing. Based on the source and destination addresses the analysis device 40 identifies a matching stream object 80. If a corresponding stream object 80 does not exist, one is created.

The analysis device 40 compares MAC addresses and network addresses. If the source MAC address matches the source network address then the packet record corresponds to the first hop of a new packet flow and a new packet flow record is created, updated with information on the first hop and added to the list of temporary packet flow records.

If the destination MAC address matches the destination network address then the correlated packet record 32 corresponds to the last hop of a packet flow. The analysis device 40 identifies the packet flow record in the list of temporary packet flow records and transfers the packet flow record to the packet flow record list. This triggers a completion of the packet flow processing which causes the route measurements data structures 114 to update and triggers application layer measurement processing.

If the destination MAC address matches the destination network address more than once, then the analysis device 40 determines that duplicate network packets were transmitted and reports duplicate packet measurements.

If the correlated packet record 32 does not correspond to the first or last hop, then the analysis device 40 identifies the temporary packet flow record for correlated packet record 32 and updates the temporary packet flow with this latest intermediate hop.

In one embodiment, there is an aging process to process incomplete packet flow records at the end of every measurement interval. Any temporary packet flow record that has not been updated for a configurable timeout interval is marked as an incomplete route and transferred from the temporary list of packet flow records to the list of completed packet flow records.

Thereafter, step 160 may perform application layer processing on the identified routes. In the example embodiment, application layer functionality is represented as endpoints that embody the functionality of a particular network device, and a single network device may support multiple endpoints. The analysis device 40 processes valid application layer packets and ignores other packets. The application layer packets are analyzed to determine the endpoints identified by the packets. If a new endpoint is detected, a corresponding device object 76 in the NetworkTopology data structure 70 is updated to reflect the new endpoint. Application layer information, such as a supported application and attributes, about the endpoint is stored therein.

On completion of a network layer packet flow record, the application layer information relevant to the flow record is updated. Such information may include the source and destination endpoint. Flows between endpoints are stored as application endpoint (EP) Binding objects 84 as part of the stream object within 80 the overall measurements data structure 94.

FIG. 8 is a flow diagram 170 of the measurement subsystem and visualization subsystem processes and supporting data structure. A measurements subsystem 172, which may be implemented by software instructions embedded in the analysis system 40, comprises user-definable measurement controls 174 that provide a user with measurement controls and allow the user to configure measurements. Step 176 registers measurements at the end of a measurements interval, and step 178 presents the measurements to the user via a measurements environment, such as an application window. A visualization subsystem 180 provides a visual representation of the network to facilitate analysis. An example visual representation may include the network structure or topology, device objects, stream and route illustrations, and APS connectivity.

Figure 9:
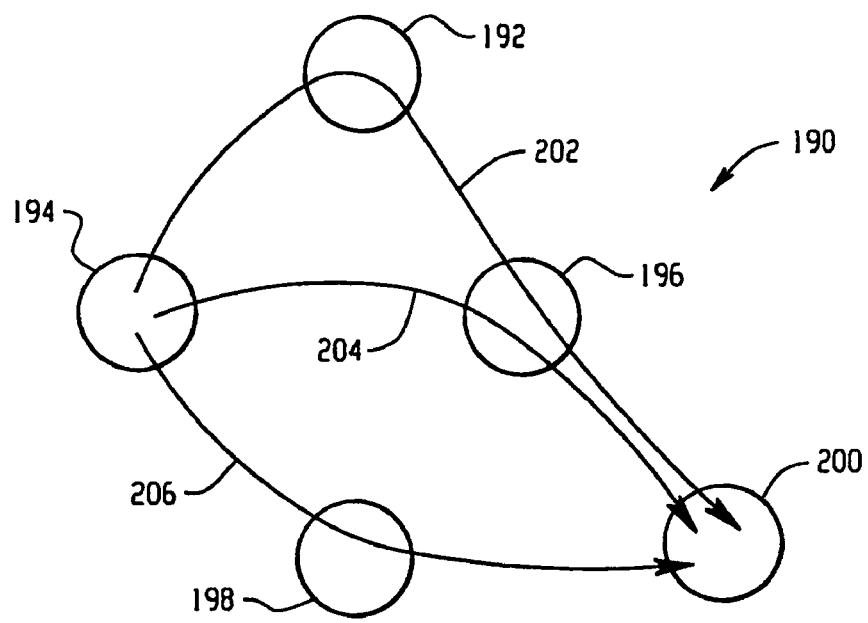
FIG. 9 is an example visual representation of devices according to a network topology and corresponding packet flows.

FIG. 9 is an example visual representation 190 of devices according to a network topology and corresponding packet flows. The results of the analysis device 40 processing can be revealed graphically using a device visualization diagram. Illustrated is a simple five node network, with node 192 defining the top of a device tree and having two children nodes 194 and 196. Node 196, in turn, has children nodes 198 and 200. The five nodes in a tree structure represent the device visualization structure.

Detected packet flows, data for which is stored in the packet flow records 44, may be mapped onto the visual representation 190. Each packet flow record 44 defines a packet path taken through the network. Each packet flow is depicted using a spline 202, 204 or 206 that connects through each of the devices traversed by the packet as it traveled through the network from source to destination. Multiple packet flow records can be shown simultaneously by drawing multiple splines, as shown in FIG. 9. Three routes are overlaid on the visual representation 190. Route 202 defines a route from device 194 to device 192 to device 196 to device 200. Route 204 defines a route from device 194 to device 196 to device 200. Route 206 defines a route from device 194 to device 198 to device 200.

In one embodiment, each spline is rendered with unique visual indicia, such as a different color. Additional information about a packet flow can be examined by selecting a spline 202, 204 or 206. Additional information can include highlighting each of the nodes traversed by the packet flow, a popup screen with statistics on the route such as the number of packet flows that were observed on the given route, or other measurements.

The baseline visualization represents the two-dimensional topology of the wireless mesh network as described in the network topology data 42 maintained by the analysis device 40. The topology may comprise a star, tree, mesh or combination thereof. Regardless of the structure, the network topology represents the devices in the network and the associations between them.

In one embodiment, the visualization device 50 may be implemented to visualize a ZigBee network. The visual representation 190 provides the basis for visualizing the result of the network (NWK) layer analysis. The visual representation 190 depicts formal associations and may also facilitate the processing of network layer analysis.

Figure 10:
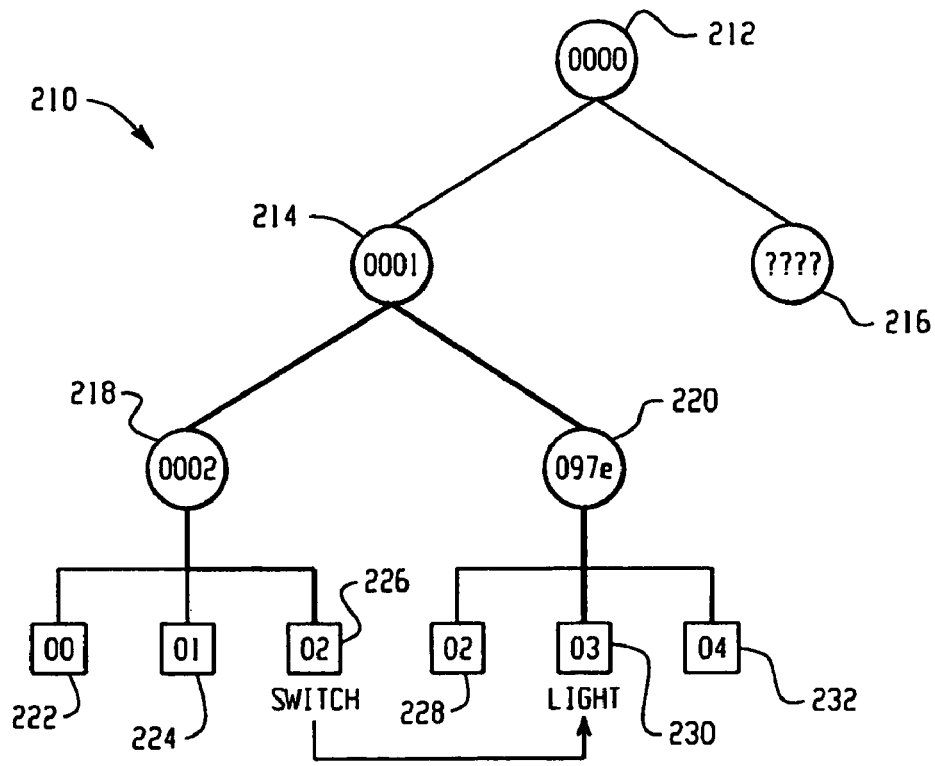
FIG. 10 is an example visual representation of devices according to a network topology and corresponding application endpoint bindings.

FIG. 10 is an example visual representation 210 of devices 212, 214, 216, 218, and 220 according to a network topology and corresponding application endpoint bindings 222, 224, 226, 228, 230 and 232. The packet flow records may also identify additional information about the packet flows. For example, in wireless mesh networks, end devices often contain application endpoints that encapsulate a specific application or function. A first device 218 may include a switch 226 and a second device 220 may include a light 230. The packet flow record analysis can reveal that a given packet flow corresponds to a binding between two application endpoints, such as a switch 226 to a light 230 between devices 218 and 220. Thus the visualization representation 210 may provide details of application end-point bindings and be labeled with the detailed functions of each endpoint. This enhances the usefulness of the network visualization by relating it to the function of the devices themselves.

Figure 11:
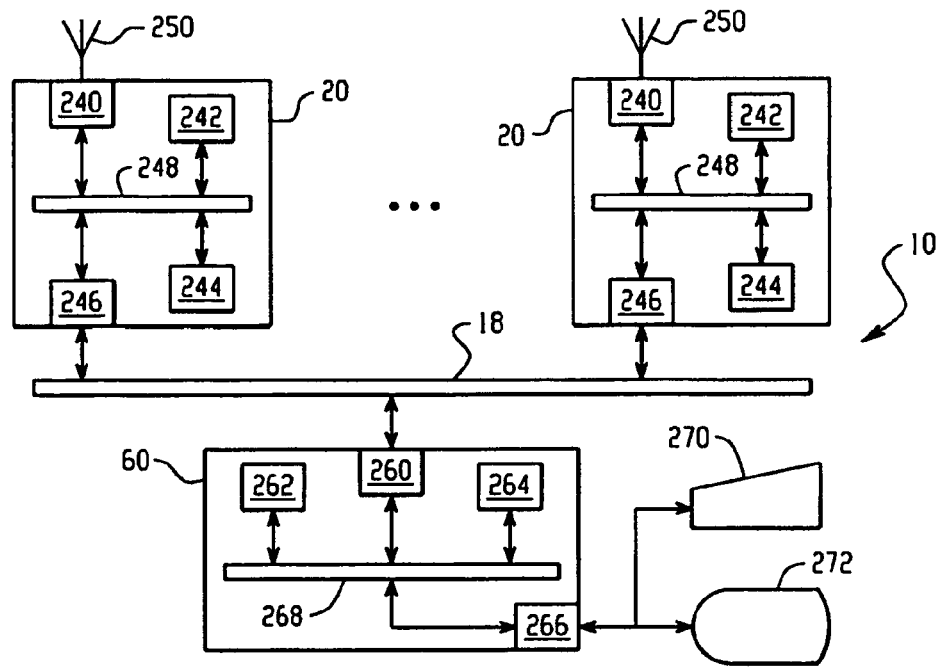
FIG. 11 is a block diagram of another example network analysis system.

FIG. 11 is a block diagram of another example network analysis system 10, similar to the example of FIG. 3. A plurality of capture devices 20 each include a wireless communication subsystem 240, a processing subsystem 242, a data store 244, and an out-of-band communication subsystem 246. The wireless communication subsystem 240, processing subsystem 242, data store 244, and the out-of-band communication subsystem 246 are in data communication via a bus system 248. The bus system 248 may comprise parallel and serial data busses. The wireless communication subsystem 240 detects packets communicated over a wireless link via an antenna 250.

Packet records are communicated to a computer 60 via a network 18, such as an Ethernet network. The computer 60 comprises an out-of-band communication subsystem 260, a processor 262, a data store 264, an I/O subsystem 266, and a data bus 268. The I/O subsystem includes a user-input device 270, such as a keyboard, and a display 272. The out-of-band communication subsystem 260 may also be part of the I/O subsystem 266. The computer system 60 may include software instructions stored in the data store 264 that upon execution by the processor 262 provide the functionality of the correlator device 30, analysis device 40, and visualization device 50 as described above.

Figure 12:
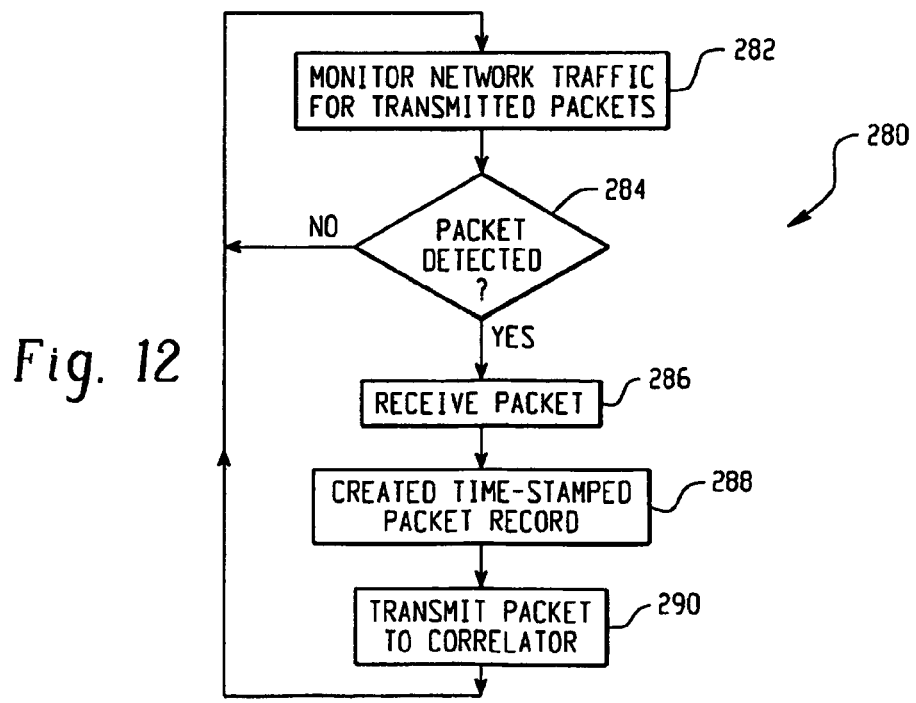
FIG. 12 is a flow diagram of an example process of creating packet records.

FIG. 12 is a flow diagram 280 of an example process of creating packet records. Step 282 monitors network traffic for transmitted packets, and step 284 determines if a packet has been detected. In one embodiment, a packet is detected upon receiving a start of frame. If a packet is not detected, the process returns to step 282. If a packet is detected, step 286 receives the packet, and step 288 creates a time-stamped packet record. Step 290 transmits the packet record to the correlator device, and the process then returns to step 282.

Figure 13:
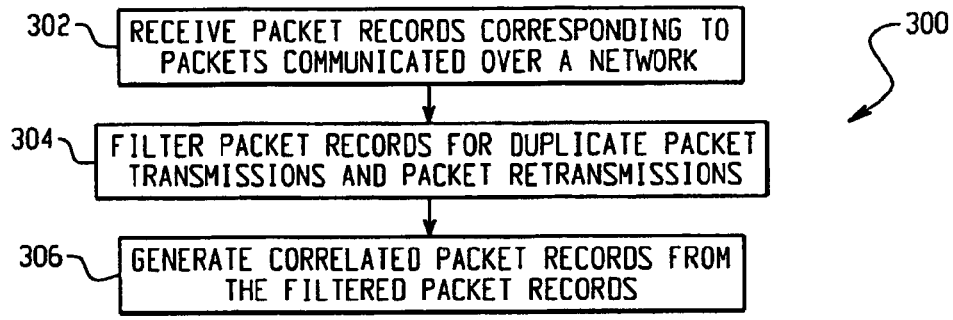
FIG. 13 is a flow diagram of an example process of creating correlated packet records.

FIG. 13 is a flow diagram 300 of an example process of creating correlated packet records. Step 302 receives packet records corresponding to packets communicated over a network. Step 304 filters the packet records for packet records corresponding to duplicate packets and packet retransmissions. Step 306 generates correlated packet records from the filtered packet records generated in step 304.

Figure 14A:
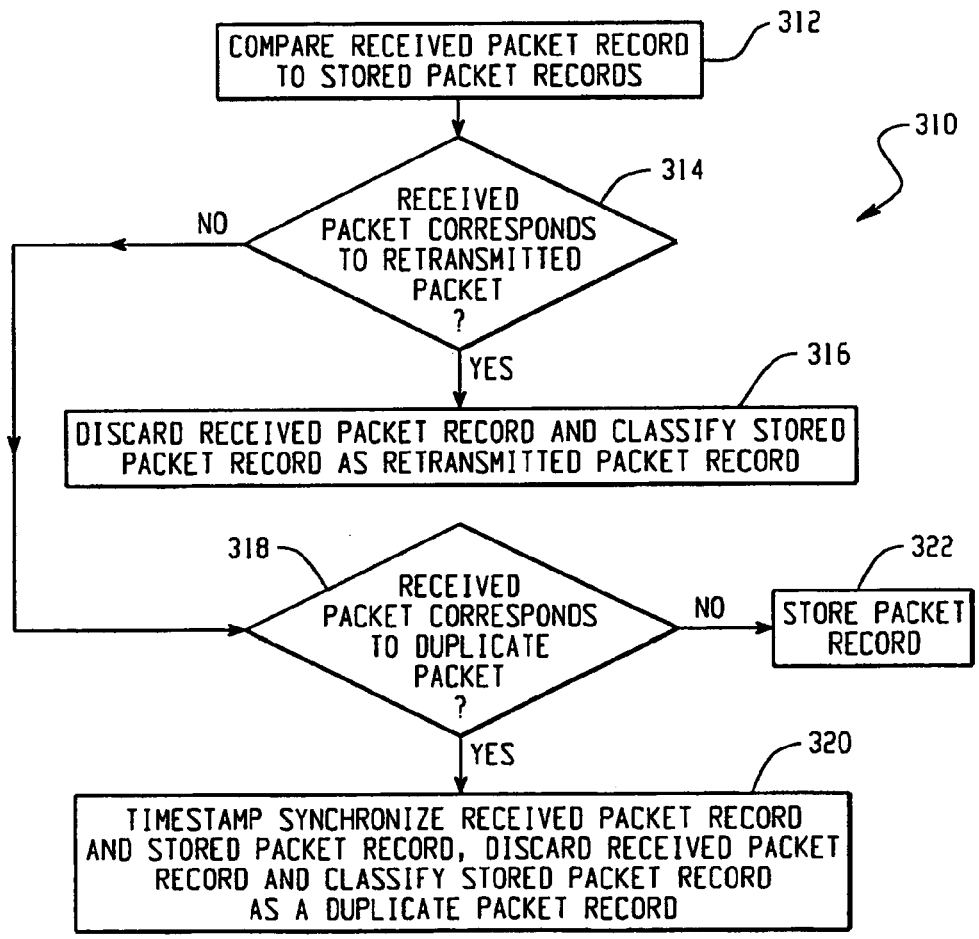
FIG. 14A is a flow diagram of an example process of filtering packet records of packet records corresponding to duplicate packets and retransmitted packets.

FIG. 14A is a flow diagram 310 of an example process of filtering packet records of packet records corresponding to duplicate packets and retransmitted packets. Step 312 compares received packet records to stored packet records. The packet records may be stored in a data store, such as a cache memory. Step 314 determines if a received packet record corresponds to a retransmitted packet. If a received packet record corresponds to a retransmitted packet of a stored packet record, the received packet record is discarded and the stored packet record is classified as a retransmitted packet record in step 316.

If a received packet record does not correspond to a retransmitted packet of a stored packet record, then step 318 determines if a received packet record corresponds to a duplicate packet of a stored packet record. If a received packet record corresponds to a duplicate packet of a stored packet record, then step 320 timestamp synchronizes the received packet record and the stored packet record, discards the received packet record, and classifies the stored packet record as a duplicate packet record. If a received packet record does not correspond to a duplicate packet of a stored packet record, then the packet record is stored in step 322.

Figure 14B:
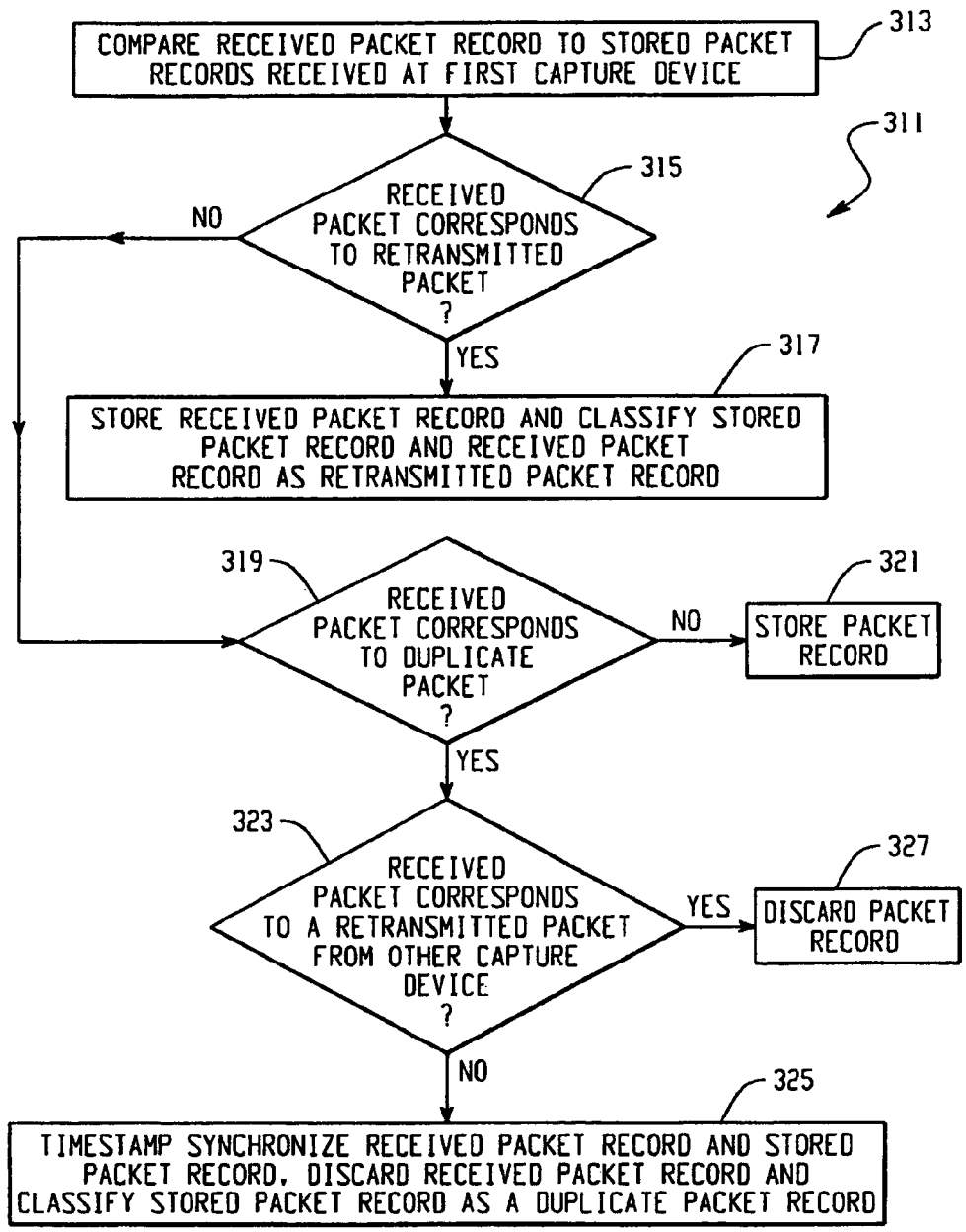
FIG. 14B is a flow diagram of an example process of filtering packet records of packet records corresponding to duplicate packets and duplicate retransmitted packets.

FIG. 14B is a flow diagram 311 of an example process of filtering packet records of packet records corresponding to duplicate packets and duplicate retransmitted packets. In this embodiment, packet records received from a particular capture device corresponding to retransmitted packets are stored for further analysis. Duplicate packet records corresponding to the retransmitted packets, e.g., packet records generated by other capture devices that correspond to the retransmitted packet, are discarded.

Step 313 compares a received packet record for a first capture device to stored packet records received from the first capture device. Step 315 determines if the received packet record corresponds to a retransmitted packet record. If so, then step 317 stores the received packet record and classifies the received packet record and stored packet record as retransmitted packet records.

If the received packet record does not correspond to a retransmitted packet record, then step 319 determines if the received packet record corresponds to a duplicate packet record. If the received packet record does not correspond to a duplicate packet record the packet record, then step 321 discards the packet record.

If the received packet record does correspond to a duplicate packet record the packet record, then step 323 determines if the received packet record corresponds to a retransmitted packet from other capture devices. If not, then step 325 timestamp synchronizes the received packet record and the stored packet record, discards the received packet record, and classifies the stored packet record as a duplicate packet record. If, however, the received packet record corresponds to a retransmitted packet from other capture devices, then step 327 discards the received packet record.

FIG. 15 is a flow diagram 330 of an example process of timestamp synchronizing packet records. Step 332 designates a first capture device as a master capture device. Step 334 calculates a timing offset representative of the time difference between which a corresponding packet was received by the master capture device and a second capture device. Step 336 applies the timing offset to all subsequent packets received by the second capture device. The flow diagram 330 of FIG. 15 may be further generalized to multiple capture devices, e.g., third, fourth and fifth capture devices, etc.

FIG. 16 is a flow diagram 340 of an example process of generating packet stream data and packet flow data. Step 342 receives correlated packet records. Step 344 processes MAC layer data and network layer data. Step 346 generates packet flow data representative of the flow of packets between devices at the MAC layer. Step 348 generates packet flow data representative of the flow of packets across the network at the network layer.

FIG. 17 is a flow diagram 350 of an example process of detecting packet flow for a stream. Step 352 identifies packet streams based on a source network layer address and a destination network layer address in a packet record. Step 354 compares a source MAC address and a destination MAC address to the source network layer address and the destination network layer address. Step 356 detects packet flows for each stream based on the comparison.

Figure 18:
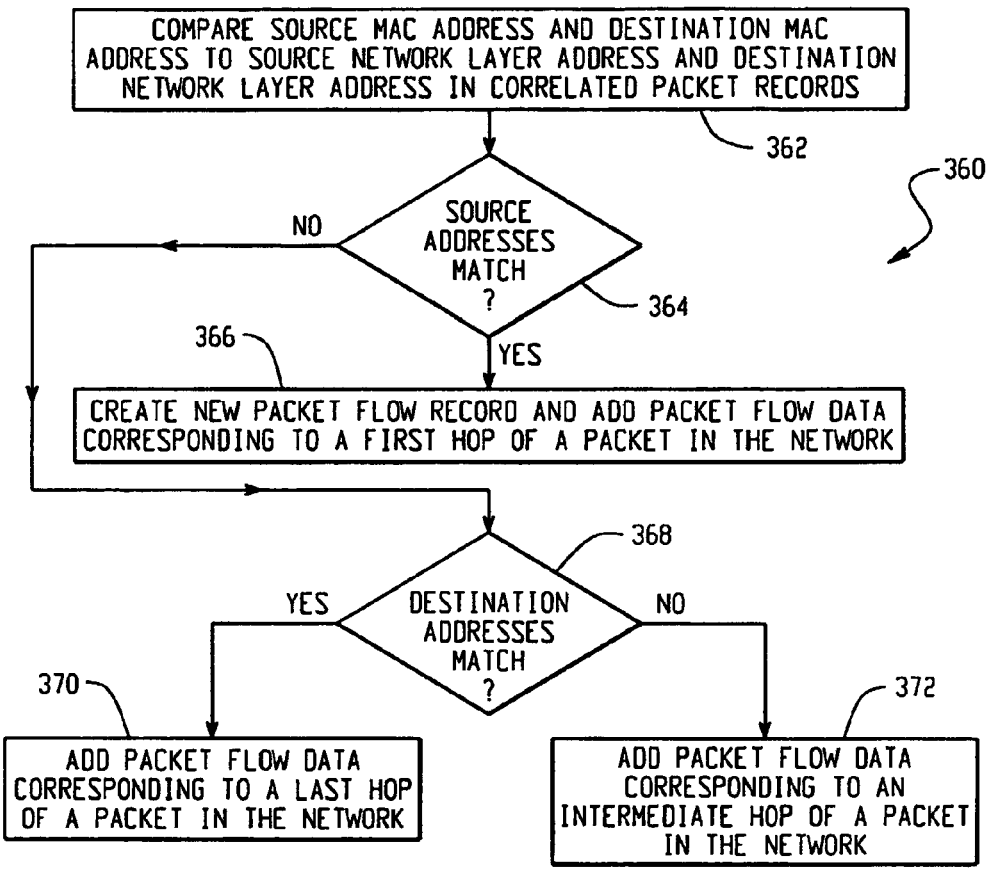
FIG. 18 is a flow diagram of another example process of detecting packet flow for a stream.

FIG. 18 is a flow diagram 360 of another example process of detecting packet flow for a stream. Step 362 compares a source MAC address and a destination MAC address to a source network layer address and a destination network layer address in a correlated packet record. Step 364 determines if the source addresses match. If the source addresses match, step 366 creates a new packet flow record and adds packet flow data corresponding to a first hop of the packet in the network. If the source addresses do not match, step 368 determines if the destination addresses match. If the destination addresses match, then step 370 adds packet flow data corresponding to a last hop of a packet in the network. If the destination addresses do not match, then step 372 adds packet flow data corresponding to an intermediate hop of a packet in the network.

Figure 19:
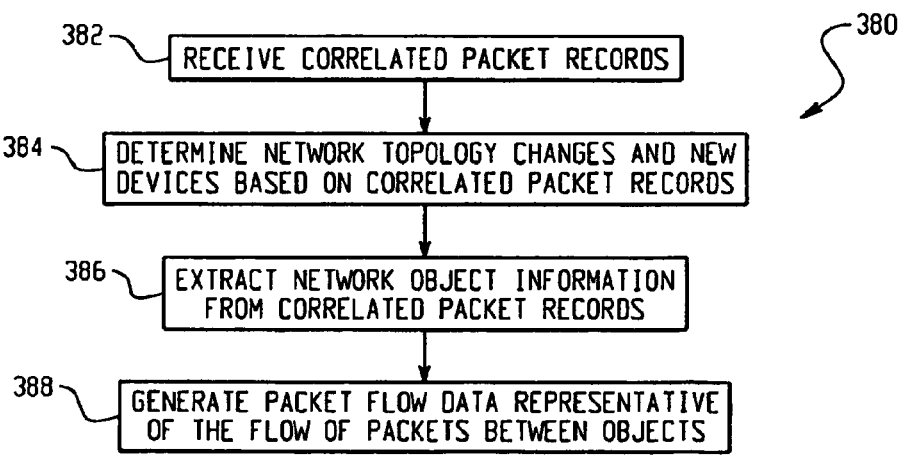
FIG. 19 is a flow diagram of an example process of determining a network topology and packet flow in the network topology.
Figure 20:
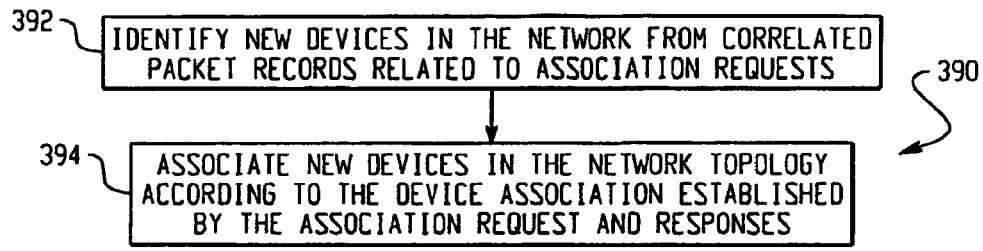
FIG. 20 is a flow diagram of an example process of updating a network topology.

FIG. 19 is a flow diagram 380 of an example process of determining a network topology and packet flow in the network topology. Step 382 receives correlated packet records. Step 384 determines network topology changes and identifies new devices based on the correlated packet records. Topology changes may be inferred implicitly based on the flow of packets through the network and addressing information stored in the packet, or may be detected based on explicit association requests and response messages as shown in FIG. 20 below. Step 386 extracts network object information from the correlated packet records. Step 388 generates packet flow data representative of the flow of packets between the objects.

FIG. 20 is a flow diagram 390 of an example process of updating a network topology. Step 392 identifies new devices in the network from correlated packet records related to association requests and responses. Step 394 associates new devices in the network topology according to the device association established by the association request.

Figure 21A:
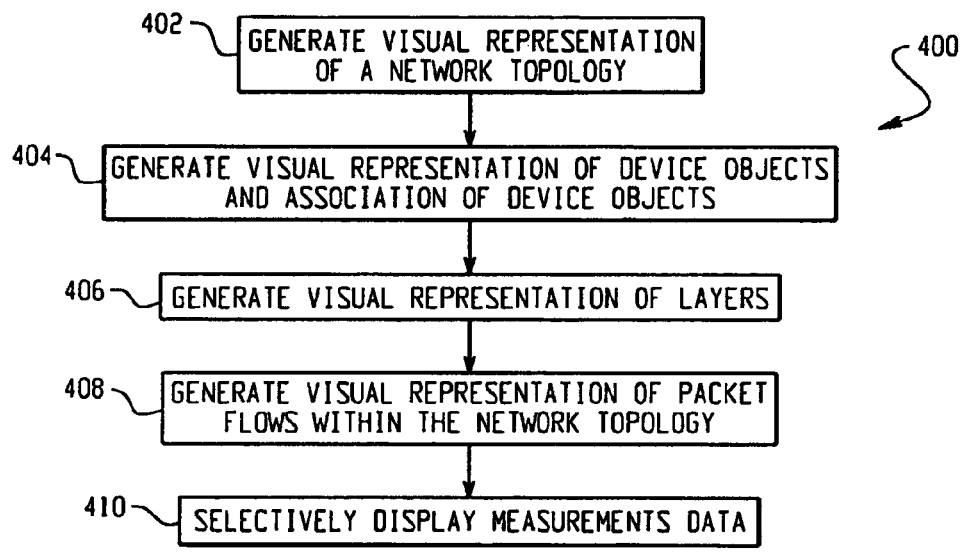
FIG. 21A is a flow diagram of an example process of generating a visual representation of a network.

FIG. 21A is a flow diagram 400 of an example process of generating a visual representation of a network. Step 402 generates a visual representation of a network topology. Step 404 generates a visual representation of device objects and associations of device objects. Step 406 generates a visual representation of layers. The layer may include a MAC layer, a network layer, and an application layer. Step 408 generates visual representation of packet flows within the network topology. Step 410 selectively displays measurement data.

Figure 21B:
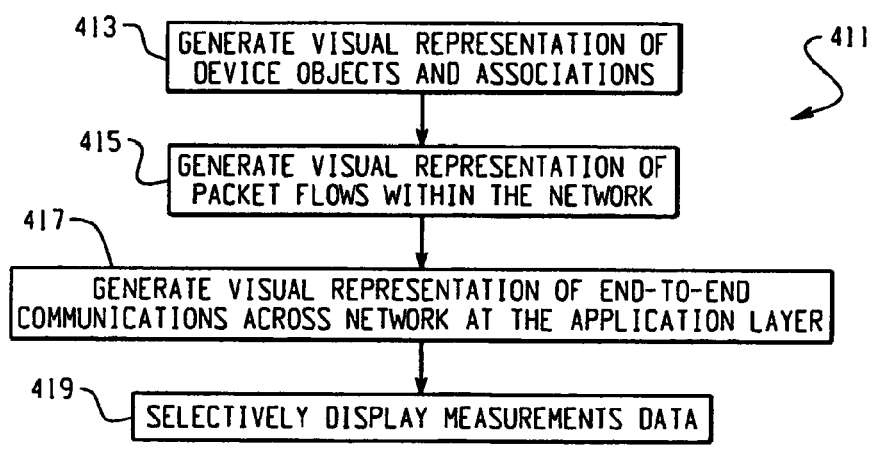
FIG. 21B is a flow diagram of another example process of generating a visual representation of a network.

FIG. 21B is a flow diagram 411 of an example process of generating a visual representation of a network. Step 413 generates a visual representation of device objects and associations. This step is illustratively directed to the MAC layer. Step 415 generates a visual representation of packet flows within the network topology. This step is illustratively directed to the network layer. Step 417 generates a visual representation of end-to-end communications across the network. This step is illustratively directed to the application layer. Step 419 selectively displays measurement data.

Figures 22, 23:
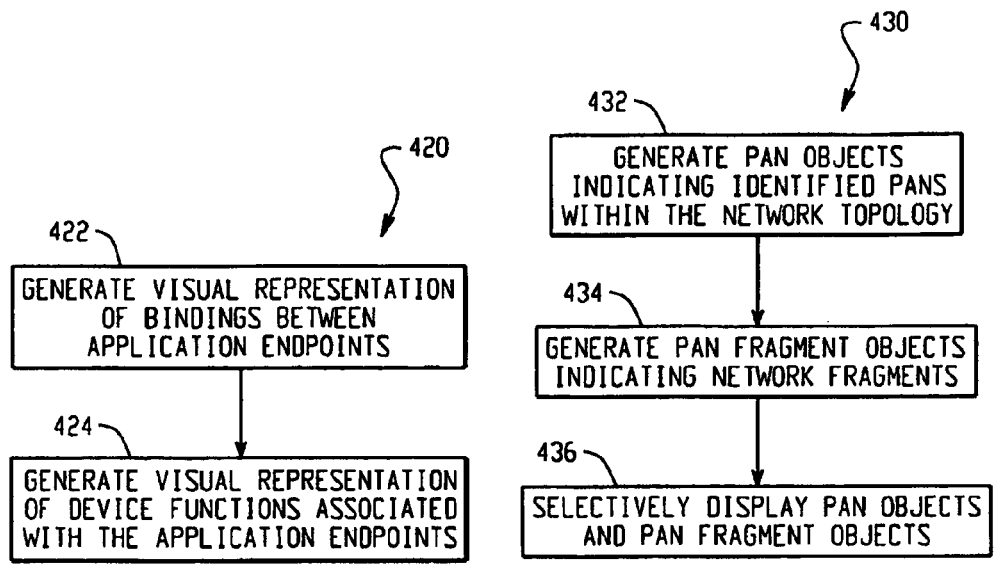
FIG. 22 is a flow diagram of an example process of generating a visual representation of device application bindings, endpoints and functions.
FIG. 23 is a flow diagram of an example process of generating personal area network (PAN) objects.

FIG. 22 is a flow diagram 420 of an example process of generating a visual representation of device application bindings, endpoints and functions. Step 422 generates a visual representation of bindings between application endpoints. Step 424 generates a visual representation of device functions associated with the application endpoints.

FIG. 23 is a flow diagram 430 of an example process of generating personal area network (PAN) objects. Step 432 generates PAN objects indicating identified PANs within the network topology. Step 434 generates PAN fragment objects indicating network fragments. Step 436 selectively displays PAN objects and PAN fragment objects.

Figure 24:
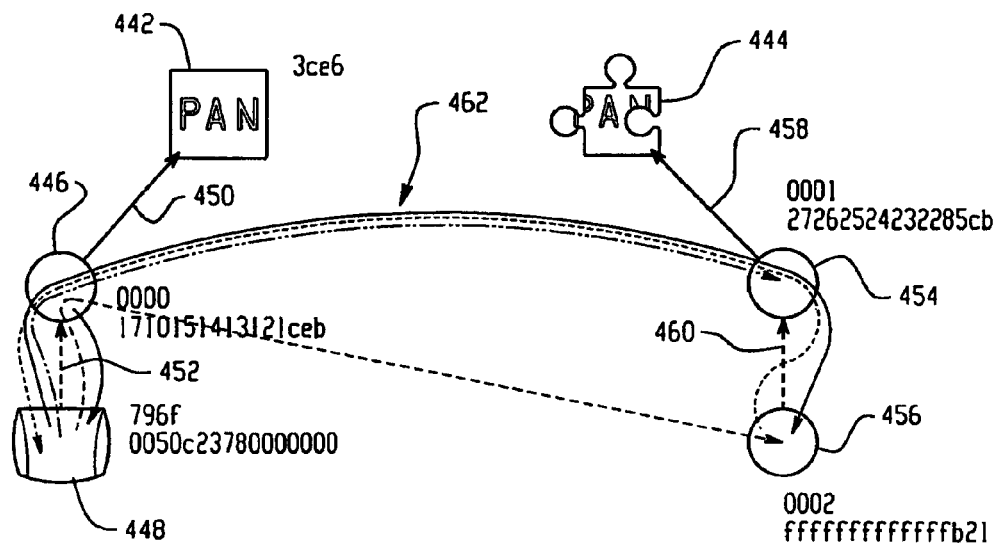
FIG. 24 is an example visual representation of PAN objects.

FIG. 24 is an example visual representation of PAN objects. Before devices can communicate in a wireless mesh network they must join a PAN. In an example ZigBee network, only devices on the same PAN can communicate. Multiple PANs, however, may share the same wireless channel, and any device receiving a packet from a different PAN will discard the packet. This allows multiple logical networks to share the same physical network, e.g., a channel or a specific frequency range.

The analysis device 50 detect packets flowing on multiple PANs simultaneously and the detected network topology is broken out at the top level into multiple PANS. PAN objects are used to display one PAN at a time. The may can select which PAN to display by right-clicking on the PAN icon, which displays a list of detected PANs to select from. When the user selects a different PAN the associated network topology is shown.

A PAN fragment object is used to show partially formed network fragments for the selected PAN. This is a partial part of the network where the analysis device 50 has not yet deduced how PAN fragment connects to the rest of the negotiation. A PAN fragment object may be used to show a partial fragment of the network that has been observed by the analysis device 40 and for which the analysis device 40 does not currently have adequate information to determine where the corresponding PAN attached to the rest of the network. Such a condition may occur when the formation of the network was not observed by the network analysis system 10. For example, the network analysis system 10 may have failed to detect some of the ASSOCIATION requests and responses. An identified PAN fragment may be the result of part of the network being formed prior to data collection by the capture devices 20, or part of the network being out of range of any capture devices 20.

A first PAN object 442 corresponds to an identified PAN in the network. The corresponding PAN of the PAN object 442 comprises network devices 446 and 448 as indicated by association lines 450 and 452. The second PAN object 444 is a PAN fragment object, indicating a network fragment. The corresponding PAN fragment of the PAN object 444 comprises network devices 454 and 456 as indicated by association lines 458 and 460. Network devices 446, 448, 454 and 456 communicate data via paths 462.

FIGS. 25-53 describe another example embodiment of the network analysis system 10 and corresponding methods described above. The example embodiment of FIGS. 25-53 describes an implementation for monitoring and analyzing ZigBee networks. Other embodiments, however, may also be used to monitor networks of different protocols.

Figure 25:
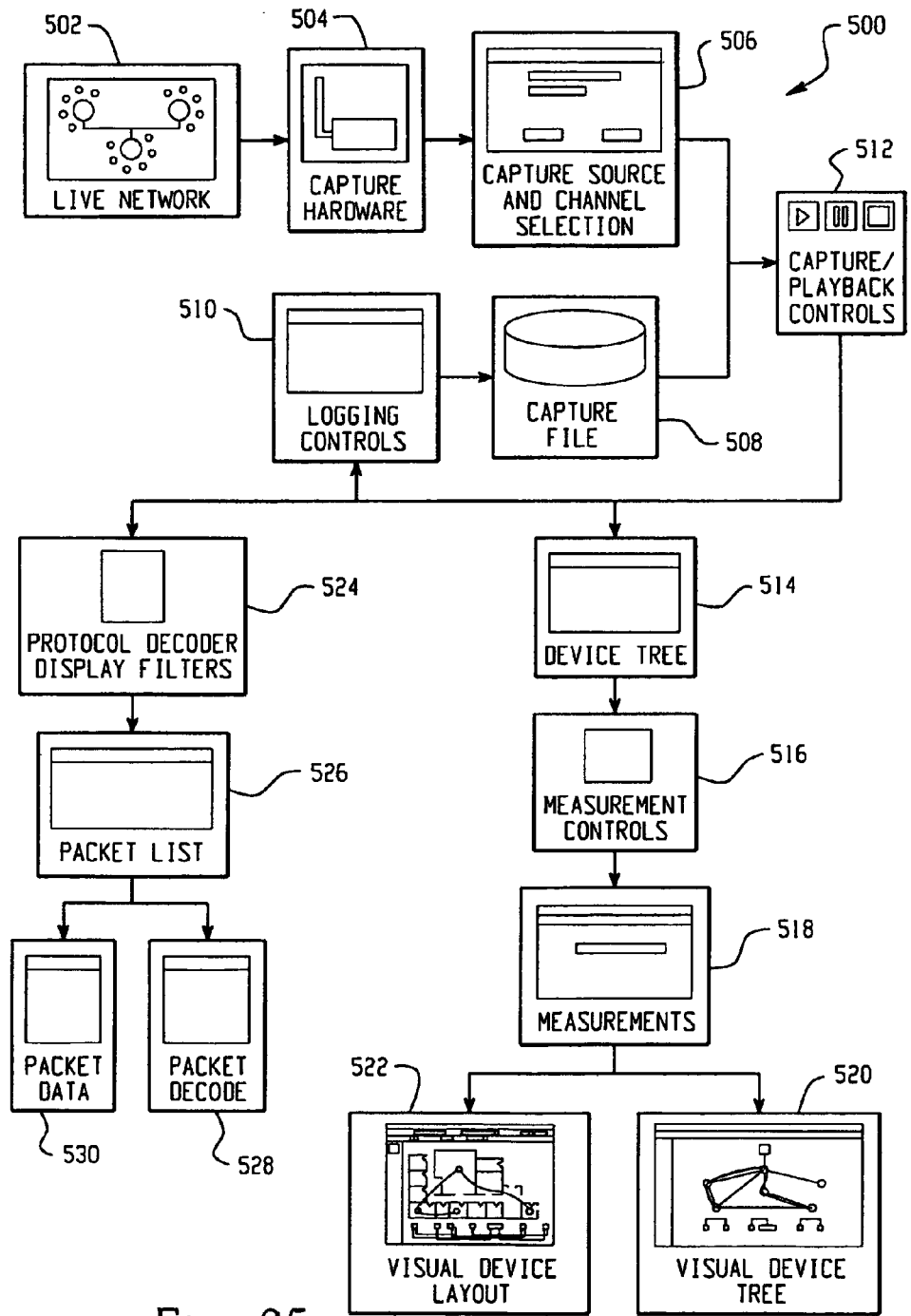
FIG. 25 is block diagram of an example operating model of a network analysis system.

FIG. 25 is a block diagram of an example operating model 500 of another example network analysis system 10. FIG. 25 illustrates components of the network analysis system 10 and its corresponding environment, and how data from live networks or previously captured files are processed by these different components. Data from a live network 502 may be monitored by capture hardware 504 as configured by channel source and channel selection controls 506. Collected data may be stored in a capture file 508. The capture file 508 may be configured according to logging controls 510. The capture file 508 may comprise actual packets 12, packet records 22 and/or correlated packet records 32. An example capture file format for a ZigBee network is provided in Table 2 below. Other capture file formats may also be used, depending on the network analysis system 10 features implemented and depending on the network communication protocol.

TABLE 2

Example Capture File Format

| Field | Length | Type | Description |
|---|---|---|---|
| Sequence | 1-10 | 32-bit unsigned decimal integer. | This is the timestamp of the packet. It increments as each packet is placed into the file. |
| Timestamp | 1-10.1-6 | 32-bit unsigned decimal integer. 32-bit unsigned decimal integer. | This is the number of the packet's arrival. The first integer is the time in seconds since midnight, Jan. 1, 1970. The second integer is an offset in microseconds from this time. The integers are separated by a period ('.'). |
| Length | 3 | 8-bit unsigned decimal integer. | This is the number of octets represented in the Data field. |
| Data | 2-250 | Concatenation of characters. | This is the packet data. Its length is determined by the Length field. The last two octets will be masked to 0xffff. |
| LQI | 5 | 16-bit unsigned decimal integer | This is the Link Quality Indicator (LQI) of the packet. |
| FCS | 1 | 0 or 1 | This is the Frame Check Sequence (FCS) correctness of the packet. If 1 the FCS was correct, if 0 the FCS was incorrect. |

Playback and analysis of the capture file 508 may be controlled via capture and playback controls 512. The capture file 508 may be analyzed by a correlator device 30 and/or an analysis device 40 to determine a device tree 514 that describes the network topology. Measurement controls 516 are used to manage the collection and analysis of measurements 518 that are, in turn, used to generate visual representations, including a visual device tree 520 and a visual device layout 522.

Packet data may also be analyzed via a packet decoder and display filter 524. Based on the input to the packet decoder and display filter 524, a packet list window 526, a packet decode window 528 and a packet data window 530 may display the decoded packet information and data.

The network analysis system 10 provides for the playback of capture files 508 previously captured from live networks. In one embodiment, the network analysis system 10 has a live network analysis mode and a post-analysis mode. The live network analysis mode analyzes network data and facilitates network analysis in near real-time. The post-analysis mode facilitates post-analysis of capture files previously captured from a live network by either a user or a third party.

Figure 26:
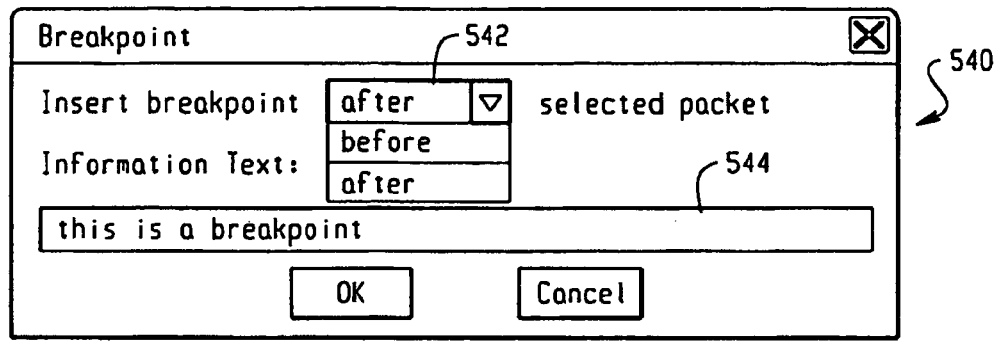
FIG. 26 is an example breakpoint dialog window.

In one embodiment, breakpoints may be added during live capture or during playback. FIG. 26 is an example breakpoint dialog window 540. During playback of a capture file 508, a packet may be selected via selection menu 542 and a breakpoint may be added before or after the selected packet. A breakpoint description may be added via a text field 544. Breakpoints may be added automatically during live capture upon the occurrence of a user-defined event, such as the occurrence of a BACON frame or a device association.

A breakpoint comprises of a user-definable string associated with the given location in the capture file. An entry is added to the capture file to represent the breakpoint. During playback, whenever a breakpoint is detected in the capture file 508, playback pauses and the breakpoint text string is displayed. Breakpoints may also be ignored by selecting a breakpoint disable mode.

Figure 27:
FIG. 27 is an example profile editor window.

FIG. 27 is an example profile editor window 550. In one embodiment, the network analysis system 10 defines ZigBee application profiles. These profiles are used to dynamically decode and analyze application layer messages. The profile editor window 550 supports the editing of an application profile. In one embodiment, each application profile is stored in a separate file. The profile editor window of FIG. 27, for example, is depicted as displaying a Home Control Lighting application profile.

The profile editor comprises a profile definition and a cluster definition. Clusters indicate the set of messages supported by the application profile. For each profile there may be one or more clusters.

Figure 28:
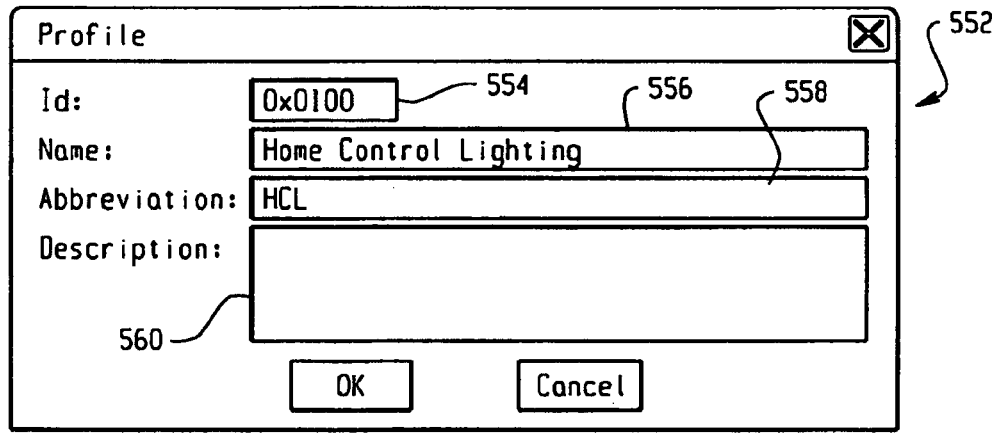
FIG. 28 is an example profile properties window.

FIG. 28 is an example profile properties window 552. A Profile ID field 554 displays the identifier that is used in the ZigBee APS Header to identify the profile. A Name field 556 displays a full name of the profile. An Abbreviation field 558 displays an abbreviated name of the profile. A Description field 560 displays additional text to describe the profile. The fields may be edited at the option of the user.

Figure 29:
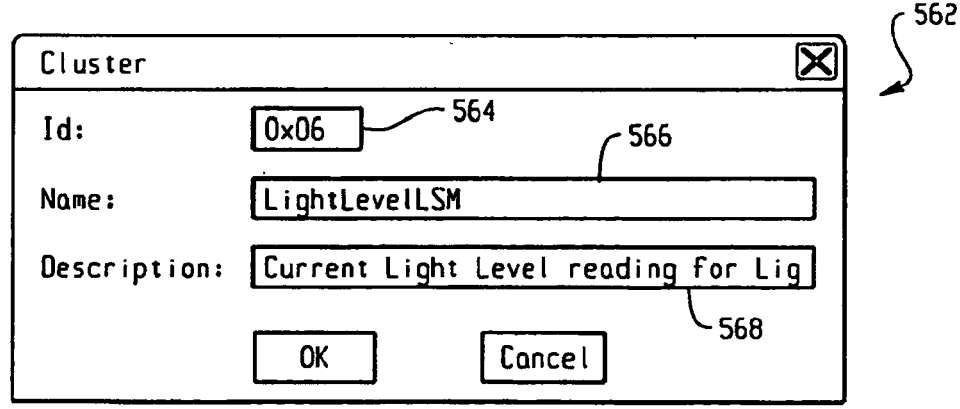
FIG. 29 is an example cluster properties window.

FIG. 29 is an example cluster properties window 562. A Cluster ID field 564 displays an identifier that is used in the ZigBee APS Header to identify a cluster. A Name field 556 displays a name of the cluster. A Description field 568 displays additional text to describe the cluster. The fields may be edited at the option of the user.

Figure 30:
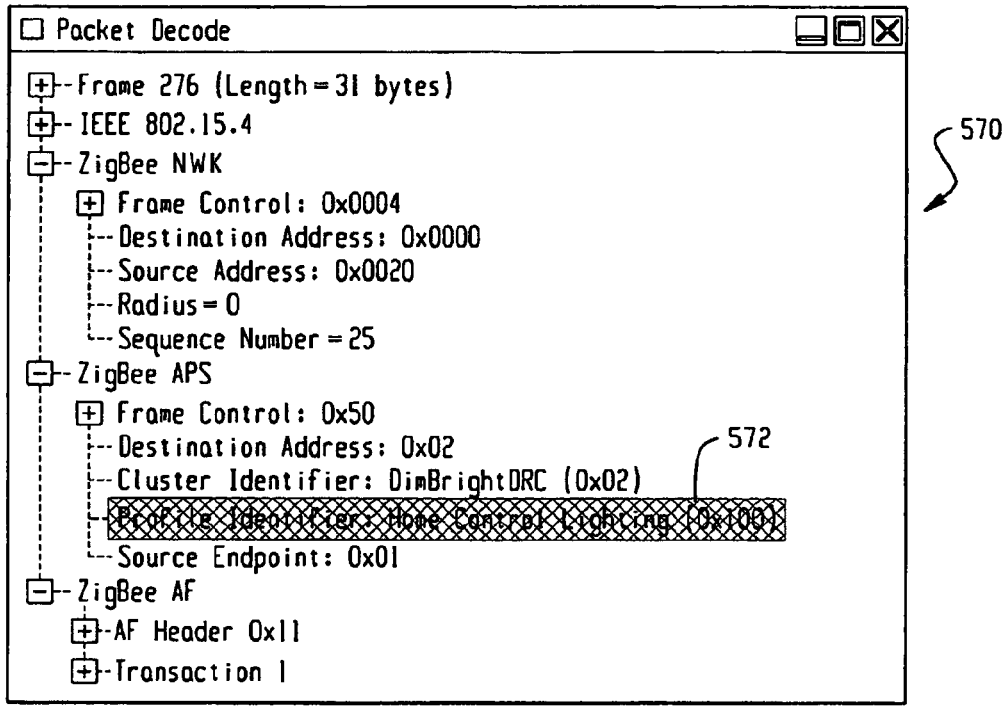
FIG. 30 is an example application layer decode window.

FIG. 30 is an example application layer decode window 570. When the packet decoder 524 is decoding application layer packets it will use the profile files to look up the Profile ID and Cluster ID fields 554 and 564 so that the names defined in these files are shown rather than just the hex values of these fields, as illustrated by the highlighted text "Home Control Lighting" 572.

Figure 31:
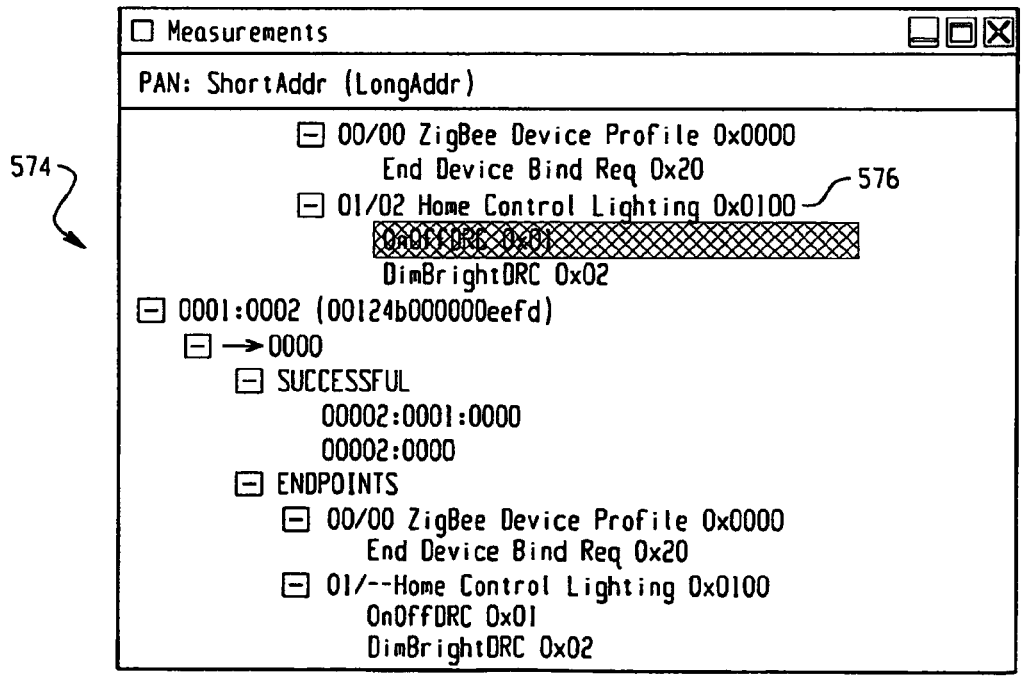
FIG. 31 is an example application layer measurements window.

FIG. 31 is an example application layer measurements window 574. In the example embodiment of FIGS. 25-53, measurements are collected on a per cluster basis, based on the clusters defined profile definition files. When an APS message is detected on a particular endpoint, the network analysis system will automatically look up the profile ID and cluster ID in the relevant profile definition file and obtain and maintain measurements, such as packet count, etc., on a per-cluster basis. The text string "Home Control Lighting" 576 indicates the profile.

Figure 32:
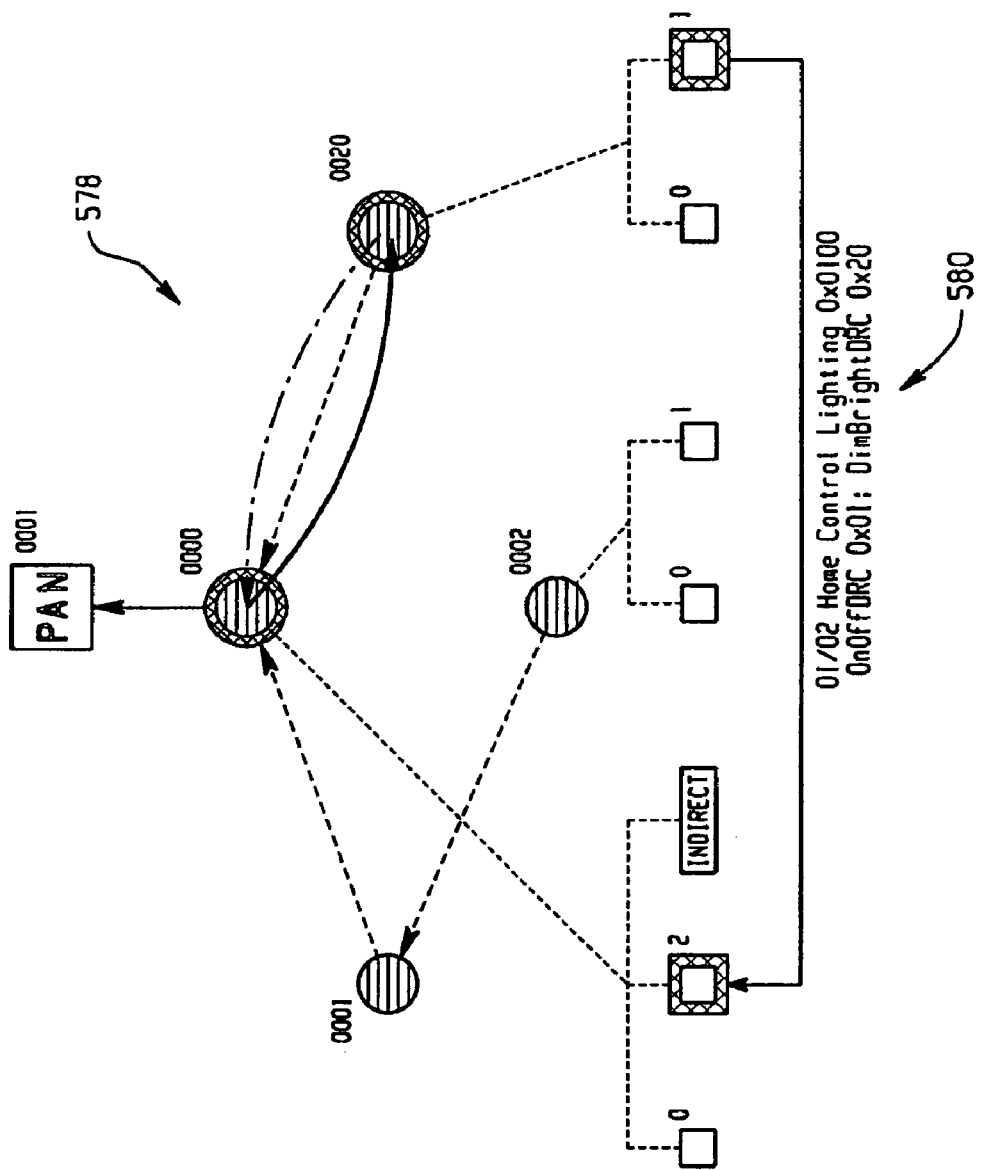
FIG. 32 is an example visual representation of an application layer in a network.

FIG. 32 is an example visual representation 578 of an application layer in a network. As application layer messages are detected by the network analysis system 10, they may be displayed on the visual representation 578. These messages may be shown as application layer bindings between application endpoint pairs. When the user selects one of these bindings the visualization 578 will display the profile names and cluster names based on the definitions stored profiles and as illustrated by text string 580.

Figure 33:
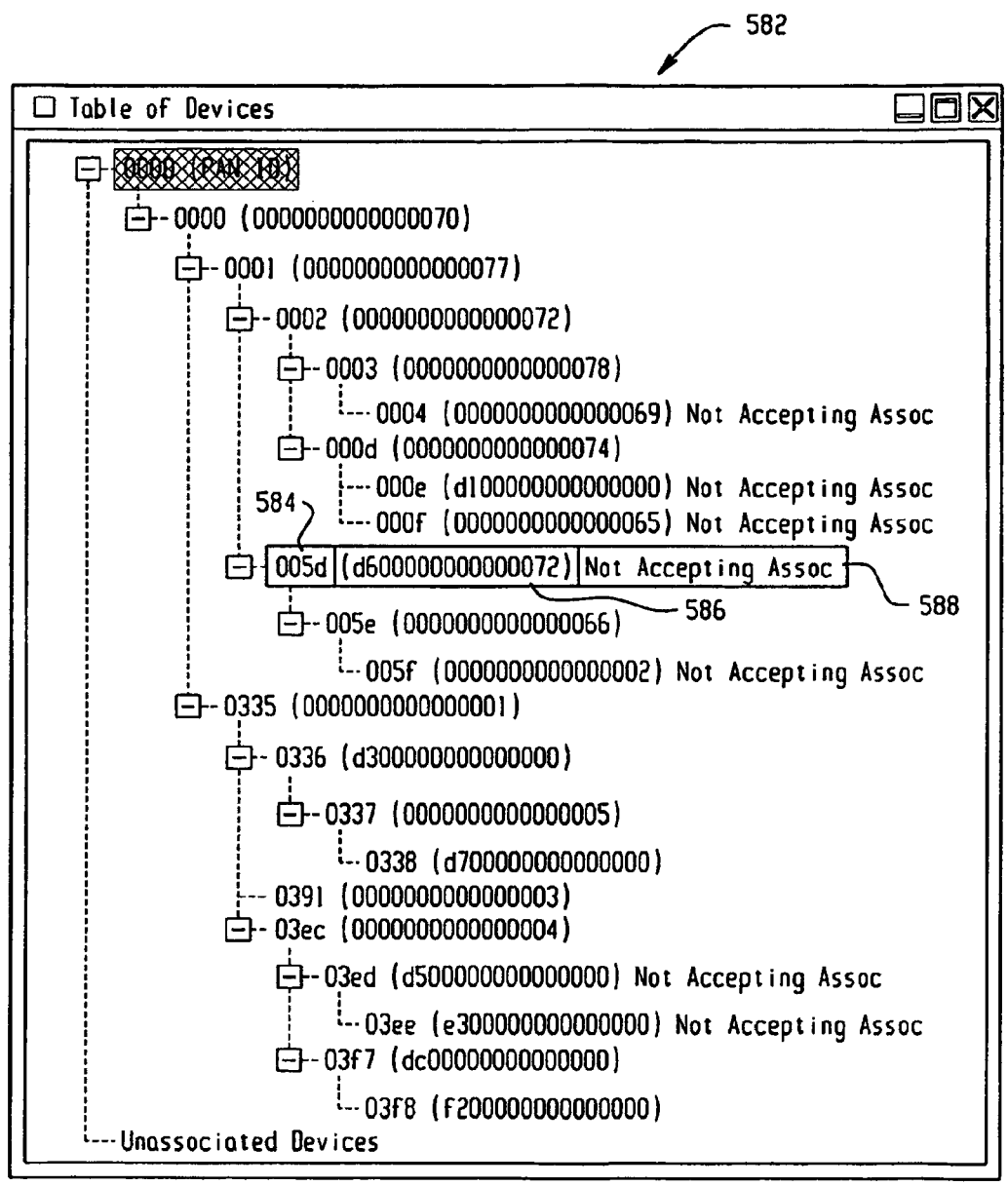
FIG. 33 is an example device tree window.

FIG. 33 is an example device tree window 582. The device tree window 582 provides a tree-view of the network topology. Each node may display its short address field 584, long address field 586, and an information field 588. The example information field indicates whether a device is currently accepting associations. In the example embodiment of 25-53, the device tree window 582 provides a network and device-centric view of an 802.15.4 or ZigBee network. The displayed device tree is created from data collected from a live capture session or from data stored in the capture file 508, and processed by the analysis device 40. Each level of the device tree may be expanded or collapsed as implied by the tree display format.

Figure 34:
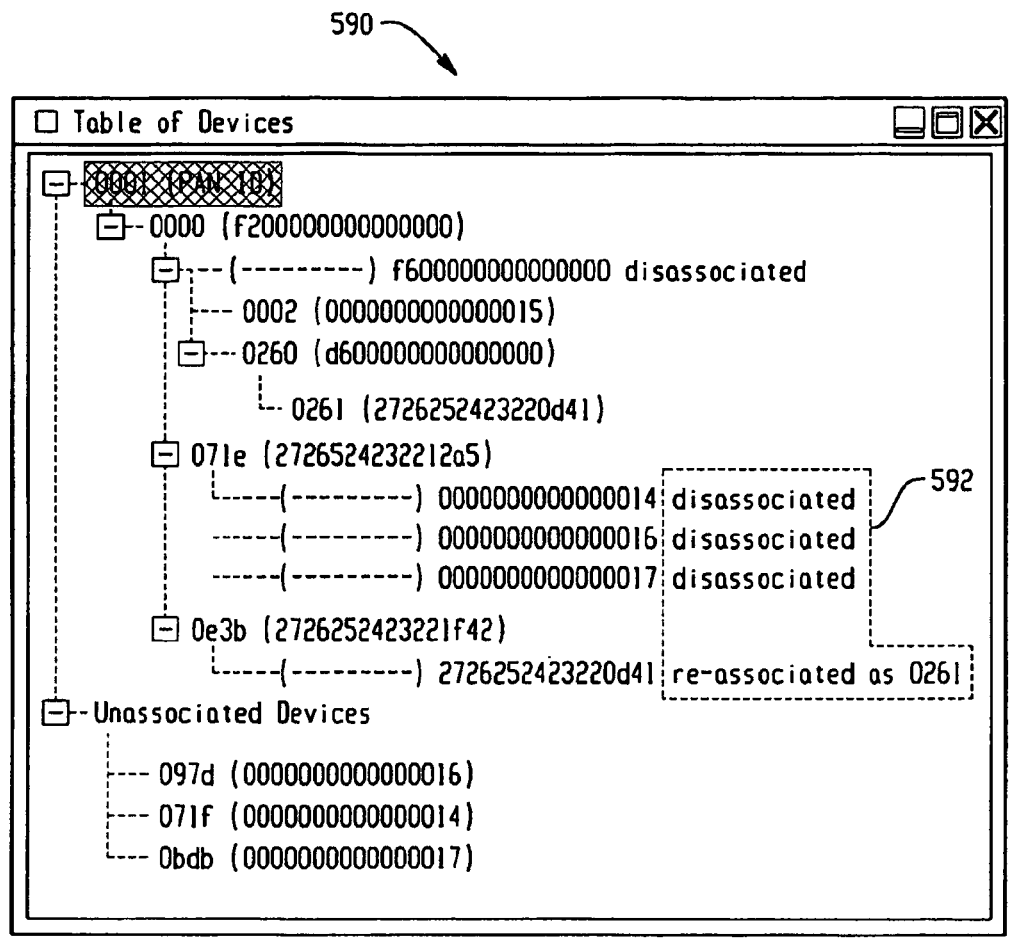
FIG. 34 is an example device tree window with de-associations and re-associations indicia.

Other information may also be displayed in the information field. FIG. 34 is an example device tree window 590 with de-associations and re-associations indicia 592 that indicate whether a device has re-associated or disassociated.

FIG. 35 is an example measurements window 600 for providing information on the states of devices, streams and routes. The measurements window 600 provides a multi-column display with the first column 602 containing an expandable/collapsible network tree hierarchy in which the network objects are listed in a device tree 604. The hierarchy supported in the tree is PAN, device, stream, route type, and route. Packets on a given route are tracked using the source device and the NWK layer sequence number. A plurality of measurements 606 may be displayed, including transmission measurements, basic packet measurements, route discovery measurements, packet performance measurements, latency measurements, physical measurements, packet measurements, and broadcast measurements. Other measurements that facilitate network analysis may also be collected and displayed.

Routes may be classified according to various types. Example route types include successful, malformed, malformed-s, reroute, and failed. A successful route classification occurs when a given packet correctly arrives at its destination and all hops from source to destination device are detected. A malformed route classification occurs when a given packet correctly arrives at its destination but not all hops are detected. For this route type, the first hop is detected. A malformed-s route classification occurs when a given packet correctly arrives at its destination but not all hops are detected, including the first hop. A reroute classification occurs when packets arrive at the destination via a re-route. A failed route classification occurs when a given network layer packet is detected at one or more hops but the packet is not detected arriving at its intended destination.

Each level of the measurements hierarchy can also be provided with a right-click context menu. Context menus enable the selection and highlighting of corresponding items in the visual device tree 604, or provide shortcut packet filter operations to filter the packets shown in the packet list based on the selected item in the measurements window 600. Different context menu items are available for different items.

Figure 36:
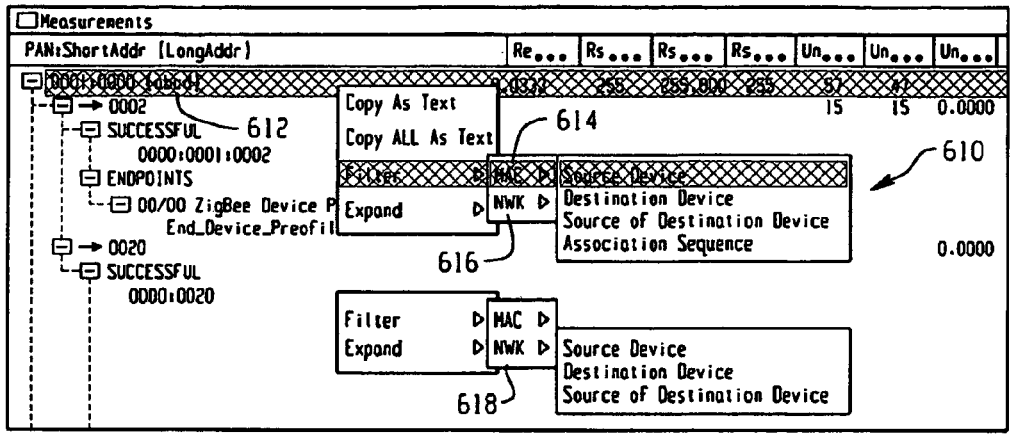
FIG. 36 is an example device context menu.

FIG. 36 is an example device context menu 610. The device context menu 610 is available by right-clicking on a device object 612 in the measurements window 600. The device context menu 610 includes MAC layer filters 614 to match all packets where the selected device is the Source, Destination, or either, and a MAC layer filter 616 to match when this device has participated in the MAC layer association sequence. The device context menu 610 also includes NWK layer filters 618 to match all packets where the selected device is the source, destination, or either a source or destination.

Figure 37:
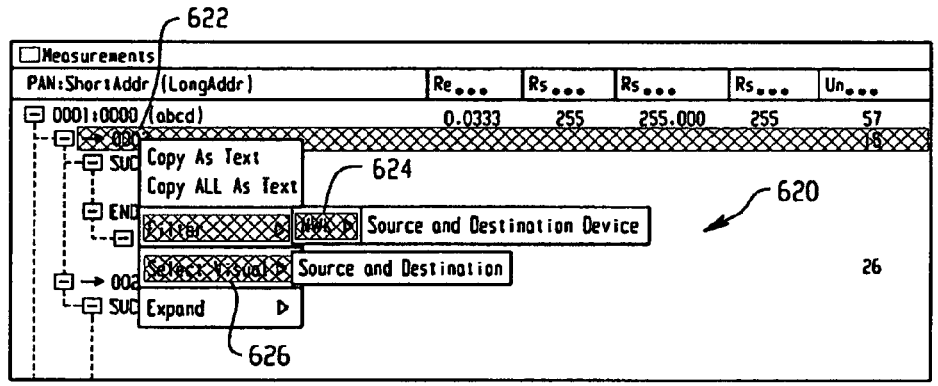
FIG. 37 is an example stream context menu.

FIG. 37 is an example stream context menu 620. The stream context menu 620 is available by right-clicking on a stream object 622 in the measurements window. The stream context menu 620 includes NWK layer filters 624 to match all packets corresponding to the selected stream, i.e., all packets between the given source and destination, and a select visual 626 menu to highlight a given source and destination device in a visual device tree.

Figure 38:
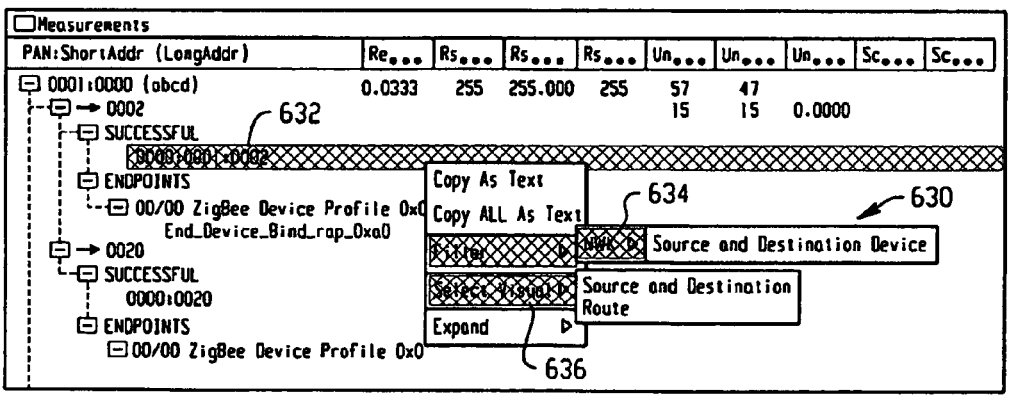
FIG. 38 is an example route context menu.

FIG. 38 is an example route context menu 630. The route context menu 630 is available by right-clicking on a route object 632 in the measurement window 600. The route context menu 630 includes NWK layer filters 634 to match all packets corresponding to the associated stream and a select visual 636 menu to highlight the given source and destination device in a visual device tree and to select and highlight the corresponding route in a visual device tree.

Figures 39, 40, 41:
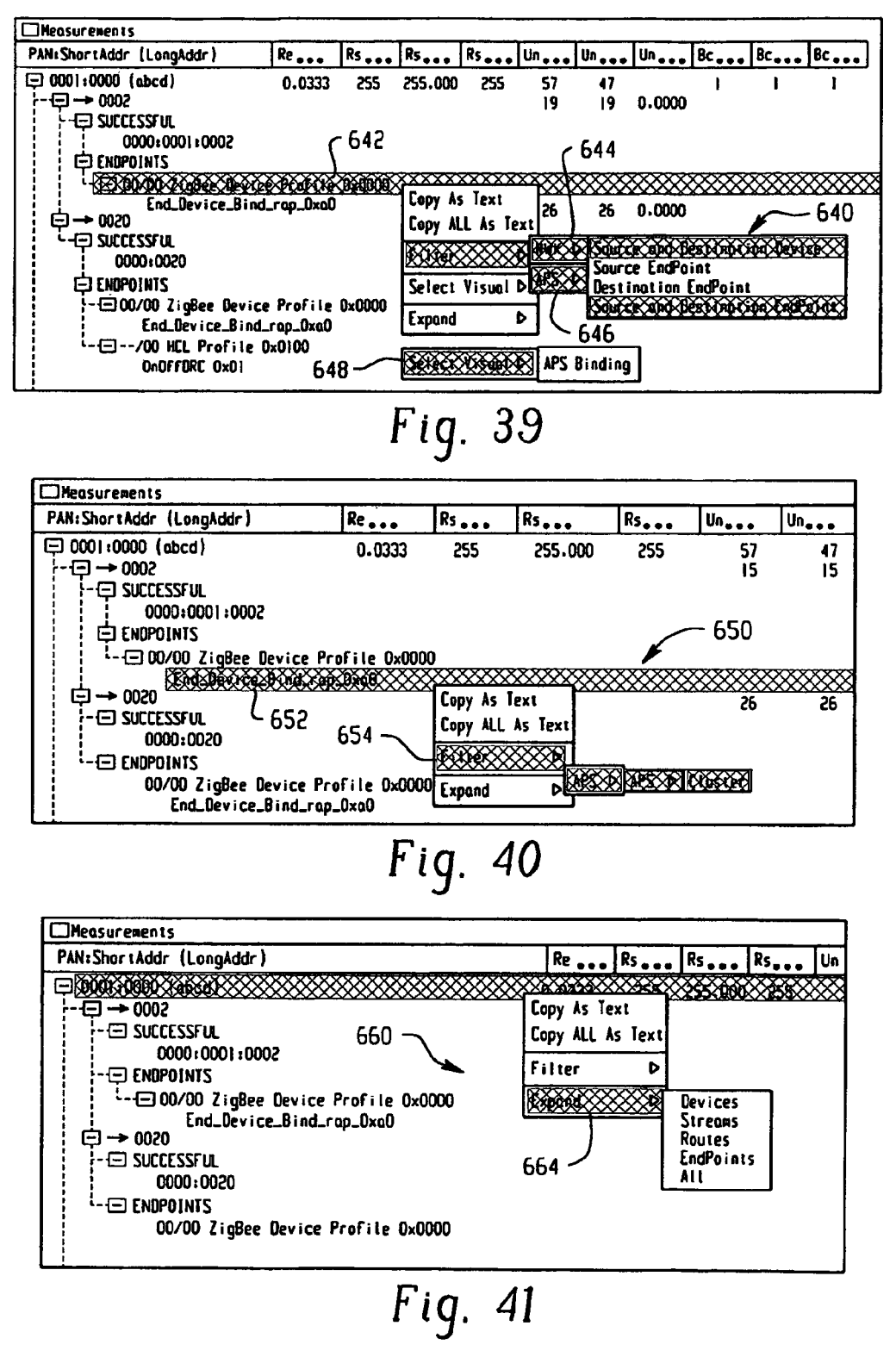

FIG. 39 is an example APS binding context menu 640. An APS binding represents all of the APS layer packets flowing between two APS endpoints on two different devices. The APS binding context menu 640 is available by right-clicking on an APS binding 642 in the measurements window 600. The APS binding context menus 640 include NWK layer filters 644 to match all packets corresponding to the associated stream, APS Layer Filters 646 to match packets flowing from a source endpoint and/or to a destination endpoint, and a select visual 648 menu to select and highlight the corresponding APS binding in a visual device tree.

FIG. 40 is an example APS cluster context menu 650. An APS cluster identifies a specific class of application layer attributes being exchanged by two APS endpoints on two different devices. The APS cluster context menu is available by right-clicking on an APS cluster object 652 in the measurements window 600. The APS cluster menu 650 includes an APS layer filter 654 to match all packets on the given cluster between the given source device/endpoint and the given destination device/endpoint.

FIG. 41 is an example Expand context menu 660. The expand context menu 660 is available for the entire Measurements Window 600 and is not specific to different levels of the measurement hierarchy. The expand context menu 660 may be used to select to what level the measurements window 600 is expanded and collapsed and hence determines what is shown at any point in time. For example, an expand menu 664 may be used to expand or collapse the measurements window 600 to the device level, streams level, routes level, endpoints level, or to all levels.

Figure 42:
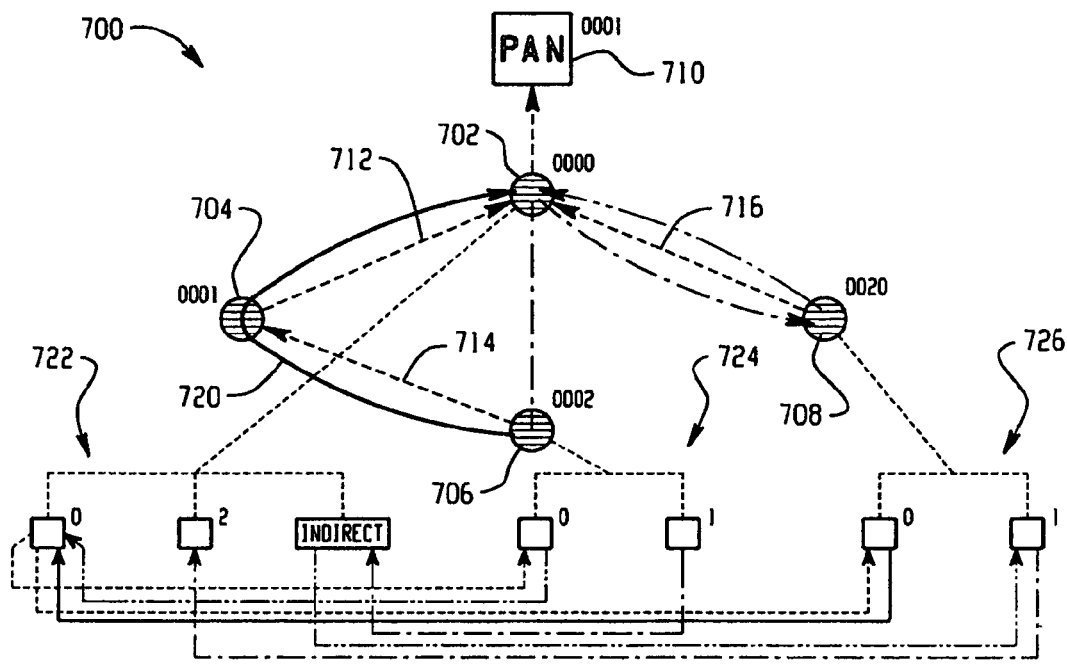
FIG. 42 is an example visual representation of a device tree.

FIG. 42 is an example visual representation of a device tree 700. The visual devices tree 700 provides a graphical rendition of network topology and information flows between devices 702, 704, 706 and 708 that define the PAN 710. Devices are added dynamically based on 802.15.4 association response messages. Lines 712, 714 and 716 are shown between parent and child devices to indicate a MAC layer association. Routes, such as route 720, may be displayed on the visual device tree 700. Route displays can be filtered to show only those routes to and from a given device by selecting the device on the visual device tree 700. A given route, such as route 720, can be selected by clicking on the route line so that each device traversed by the route is highlighted. Application endpoints may also be shown. For example, application endpoints 722, 724 and 726, associated with devices 702, 706 and 708, respectively, are illustrated. Addressing scheme may also be indicated, all illustrated by an indirect addressing object 730.

In one embodiment, a single PAN is displayed at any one time. The current PAN ID for the PAN object 710 is represented by a rectangle as the root of the tree. A selectable list of available PANs for display may be displayed by right-clicking on the PAN object 710. Selecting a PAN ID will display a visual device tree for the selected PAN.

Figure 43:
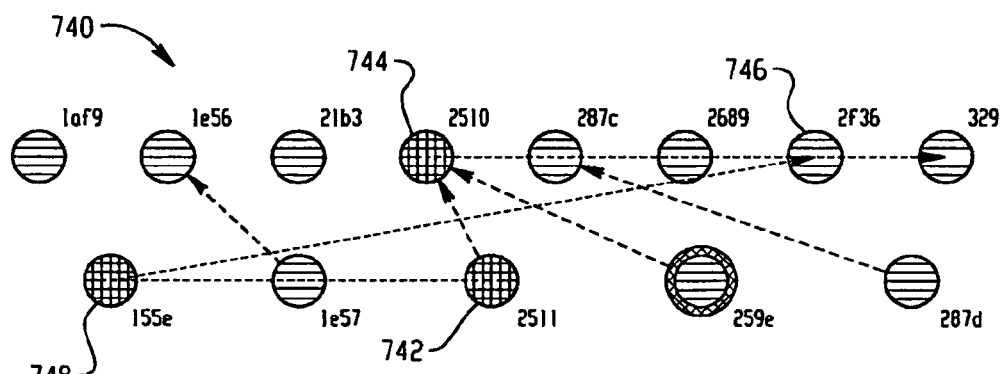
FIG. 43 is an example visual representation of device re-associations.

FIG. 43 is an example visual representation 740 of device re-associations. In an 802.15.4 network it is not uncommon for a device to lose its association and re-associate with another device in the network. For re-associated devices, their previous location in the visual device tree 700 is indicated by visual re-association indicia, such as an offset color. An arrow linking the old location to the new location in the visual device tree 700 with an arrowhead indicating the old and new location may also be displayed. A chain of linked re-associated nodes may be used to display multiple re-associations of the same device. For example, in FIG. 43, a device 742 was previously a child of device 744, and was re-associated to device 746. The address of the device 742 was changed from 2511 to 155a, and thus upon re-association the device appears as device 748. Accordingly, the device objects 742, 744 and 748 are displayed with an offset color. The visual re-association indicia may be selectively displayed.

Figure 44:
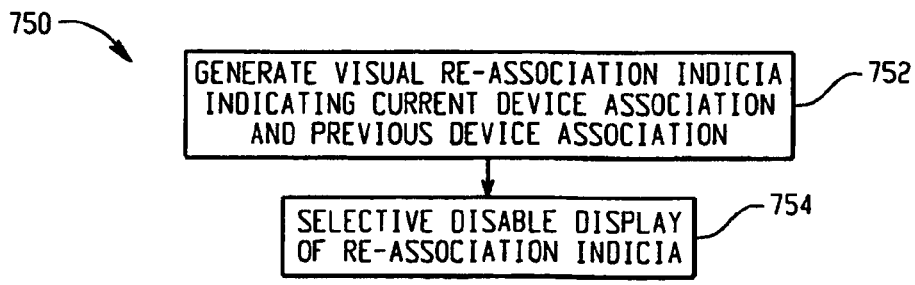
FIG. 44 is a flow diagram of an example process of generating visual re-association indicia of device associations.

FIG. 44 is a flow diagram 750 of an example process of generating visual re-association indicia of device associations. Step 752 generates visual re-association indicia indicating a current device association and a previous device association. Step 754 selectively disables display of the re-association indicia.

Other visual representations may also be generated. For example, if a particular device is retransmitting a packet, the corresponding device object may be highlighted by visual highlight indicia, such as a conspicuous color, e.g., outlined in yellow, indicating a possible communication problem.

Figure 45:
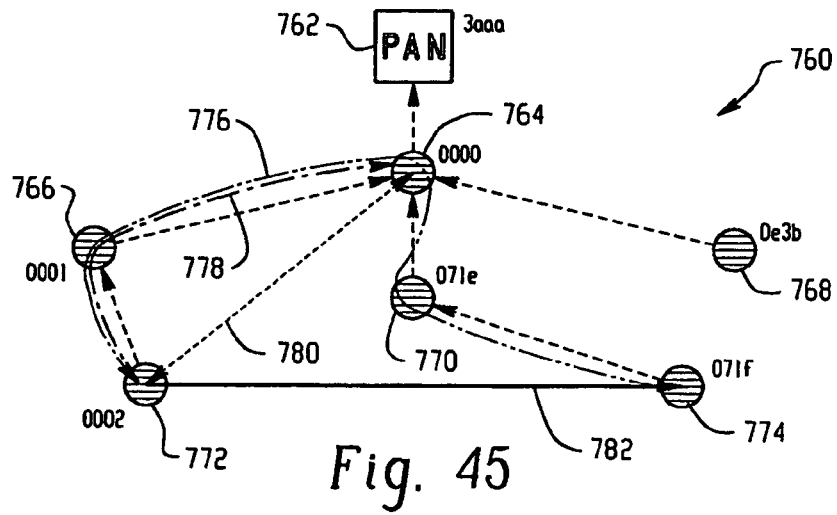
FIG. 45 is an example visual representation of routes.

FIG. 45 is an example visual representation 760 of routes. A PAN 762 comprises devices 764, 766, 768, 770, 772 and 774 associated as shown. Routes 776, 778, 780 and 782 are represented by splines with terminating arrowheads. Route 776 defines a route from device 774 to device 764 to device 766 to device 772. Route 778 defines a route from device 766 to 764. Route 780 defines a route from device 764 to device 772, and route 782 defines a route from device 772 to 774. Each spline may be rendered with differentiating indicia, such as a particular color for each spline.

Figure 46:
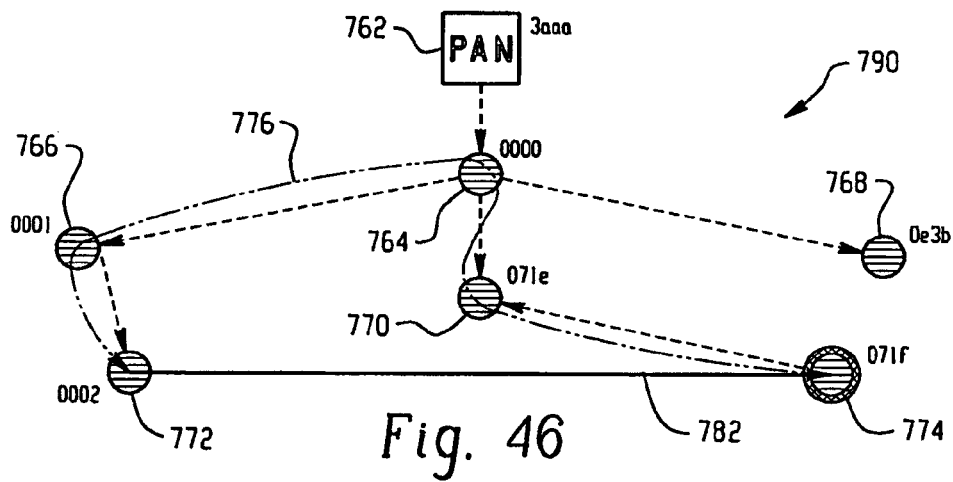
FIG. 46 is an example visual representation of a selected device and corresponding routes.

FIG. 46 is an example visual representation 790 of a selected device 774 and corresponding routes 776 and 782. Selecting the device 774 highlights the device and displays only the routes to and from the device 774, i.e., routes 776 and 782. Multiple devices can be selected using a ctrl-select by clicking the left mouse button on each device while holding down the ctrl-key. Once selected, only those routes that begin or end on the selected device(s) are shown.

Figure 47:
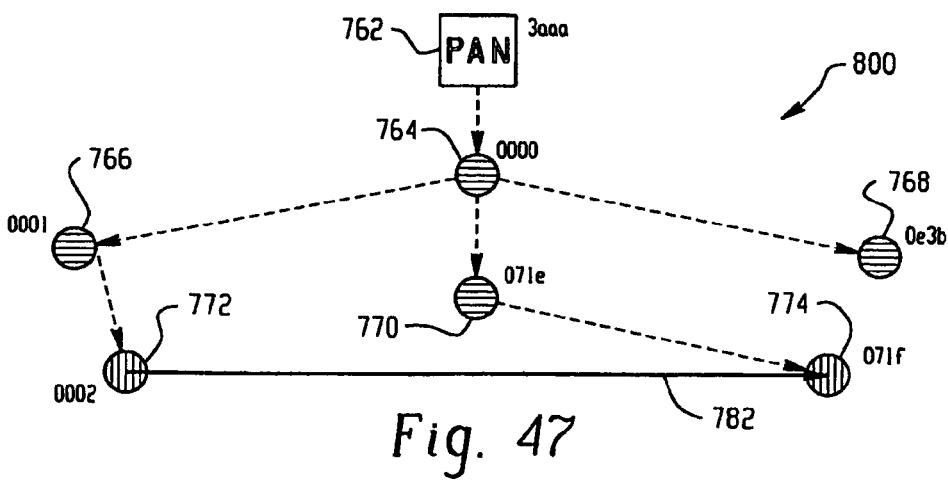
FIG. 47 is an example visual representation of route selection.

FIG. 47 is an example visual representation 800 of route selection. Upon selecting the route 782, devices 772 and 774 are highlighted. In one embodiment, when a route is selected, each of the devices the route traverses will be highlighted by visual highlight indicia using the same color as the route spline color.

Figure 48:
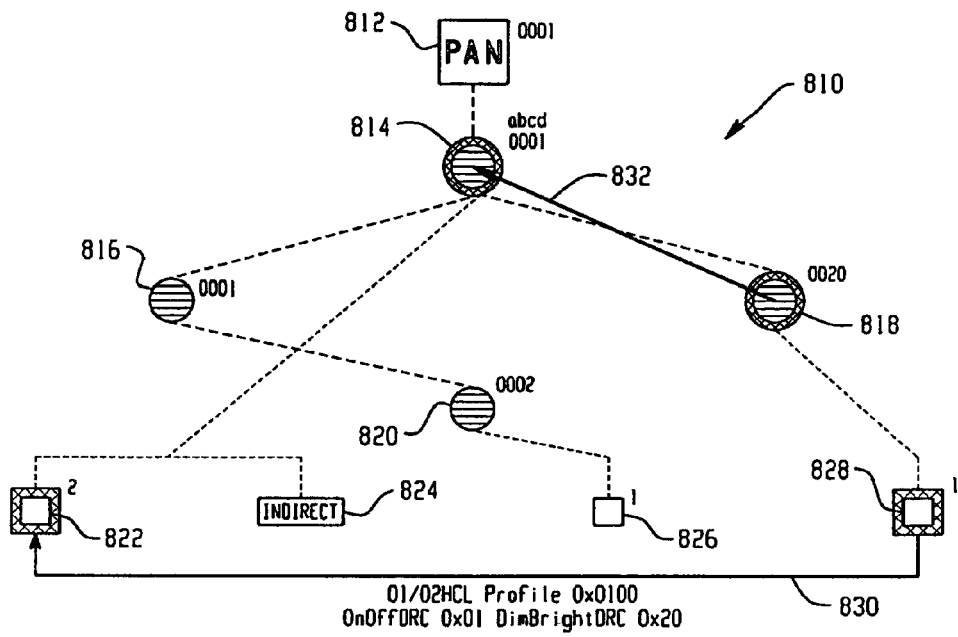
FIG. 48 is an example visual representation of direct addressing in an APS layer.
Figure 49:
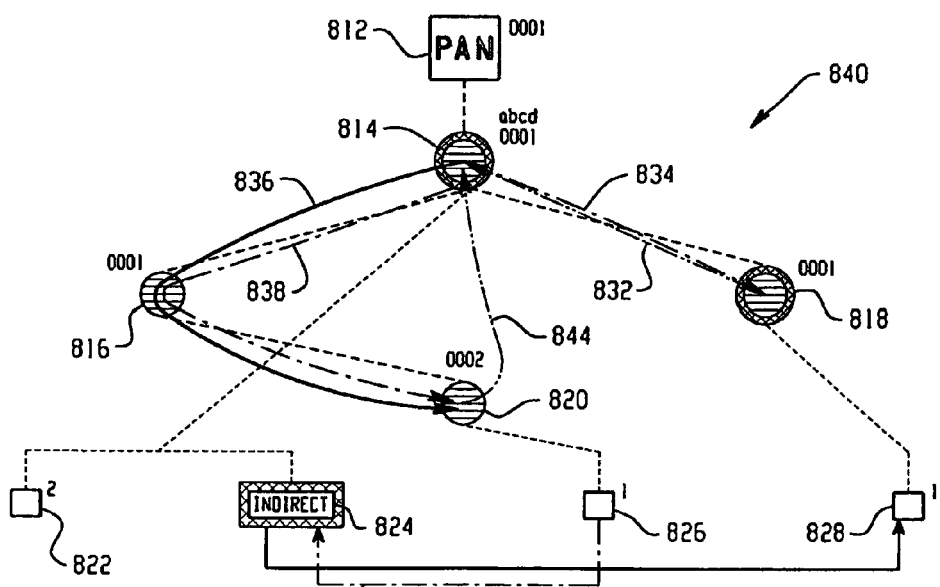
FIG. 49 is an example visual representation of indirect addressing in an APS layer.

FIG. 48 is an example visual representation 810 of direct addressing in an APS layer, and FIG. 49 is an example visual representation 830 of indirect addressing in an APS layer. The APS layer information for a PAN 812 having devices 814, 816, 818, and 820 may be displayed via the visual representation of the application endpoints 822, 824, 826 and 828.

The APS layer analysis is based on the detection of APS data packets. In a ZigBee network, the APS packet header includes the source endpoint, Profile ID, cluster ID, and destination endpoint.

There are two addressing schemes available in the APS layer—direct addressing and indirect addressing. In direct addressing, APS Packet Flows between end devices are identified. These packet flows may be broken down by end-point pairs and then be further broken down by profile ID and cluster ID. When a new packet flow is detected between endpoints, the visualization 810 is updated to show the endpoints on each end device, and to add a link between the source and destination endpoints to represent the binding. In one embodiment, the binding is implicitly determined by the network analysis system 10 by determining the link based on the flow of APS data packets and thus need not be based on the detection of explicit binding requests. The link is represented as a line linking the endpoints, such as the binding line 830 representing the binding between endpoints 822 and 828. Once selected, information about the binding, including the Profile ID and the list of cluster IDs, may be shown directly under the selected binding.

Selection of an endpoint may act as a filter that results in the display of only those bindings associated with this endpoint.

If a single binding exists for an endpoint, selecting an endpoint will select the corresponding source and destination end devices for showing routing information. The selected endpoints, devices and binding are then highlighted. For example, selecting endpoint 822 in FIG. 48 will select and highlight devices 814 and 818, endpoints 822 and 828, binding line 830, and route 832. Profile IDs and the list of cluster IDs (incoming and outgoing) active on the selected endpoint may also be displayed.

If a binding does not exist, the selection of an endpoint may act as a filter whereby only future bindings that include this endpoint will be shown. Thus when a new binding is added, the corresponding source and destination devices are automatically selected for drawing routes.

When using indirect addressing, the source or destination endpoint may be absent from the packet. Indirect addressing is used when a particular end device does not have direct support for binding, i.e., the device does not know the final destination for the APS packets it sends. Instead, the end device will forward the APS packets to the coordinator, and the coordinator performs a binding table lookup to forward the packets to the associated destinations.

Indirect addressing is visually represented by considering the flow of packets from the source endpoint to the coordinator and the flow of packets from the coordinator to destination endpoints. Each segment is shown independently in the visual devices tree, and there is an INDIRECT endpoint object associated with the coordinator. All indirect bindings are shown intersecting with the indirect endpoint object. Packet flows from source endpoint to the coordinator are shown as a binding from the source endpoint to the INDIRECT endpoint, and packet flows from the coordinator to destination endpoints are shown as a binding from the INDIRECT endpoint to the destination endpoints.

Selecting a source endpoint results in automatic selection of the corresponding end device and route to the coordinator. For example, in FIG. 49, selecting endpoint 826 results in the selection and highlighting of the endpoint 826 and the indirect endpoint 824, the binding line 842, and routes 832, 834, 836, 838, and 844.

The visual device tree also provides context menus to quickly access functions relative to various displayed objects. The right-click menu item can be selected after moving a mouse above an object in the visual device tree and selecting the right-click menu button. Device context menus, route context menus, APS endpoint context menus, and APS binding context menus similar to the context menus previously described may thus be readily accessed by a user.

Figure 50:
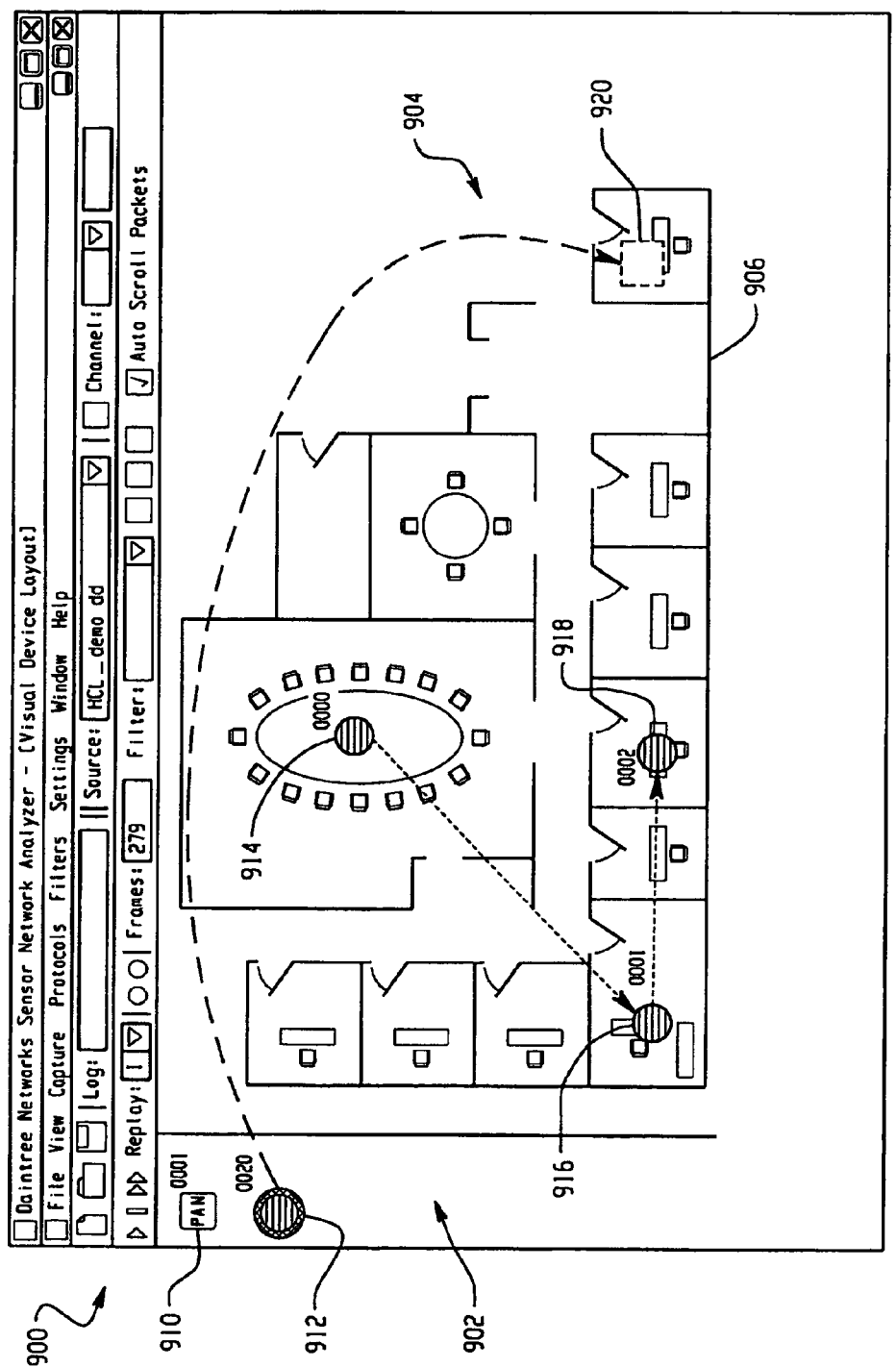
FIG. 50 is a visual device layout window.

FIG. 50 is a visual device layout window 900. The visual device layout window 900 facilitates an alternate view of a visual device tree. Instead of the network analysis system 10 automatically drawing devices in a tree, the visual device layout window 900 provides for devices to be placed by the user on a user-defined background image 906, such as a floor plan of an office. This allows the user to create a visual representation that corresponds to the physical layout of the network as deployed in the office.

Network objects are initially displayed in a placement pane 902. The placement pane 902 initially contains all identified devices and any new devices that join the network. In one embodiment, devices may be placed in a device naming table. Devices in the device naming table are displayed in the placement pane 902 and can be placed on the background image regardless of whether the devices are part of the current identified network. This allows devices to be placed on a background image to represent their physical location prior to the network being formed.

Devices may be placed in the background image by conventional drag-and-drop operations. As illustrated in FIG. 50, device objects 914, 916 and 918 have been placed against a background image 906, representing the placement of the corresponding devices as deployed in an office. Device object 912 is to be placed in area 920 on the background image 906, as represented by the dashed arrow.

Figure 51:
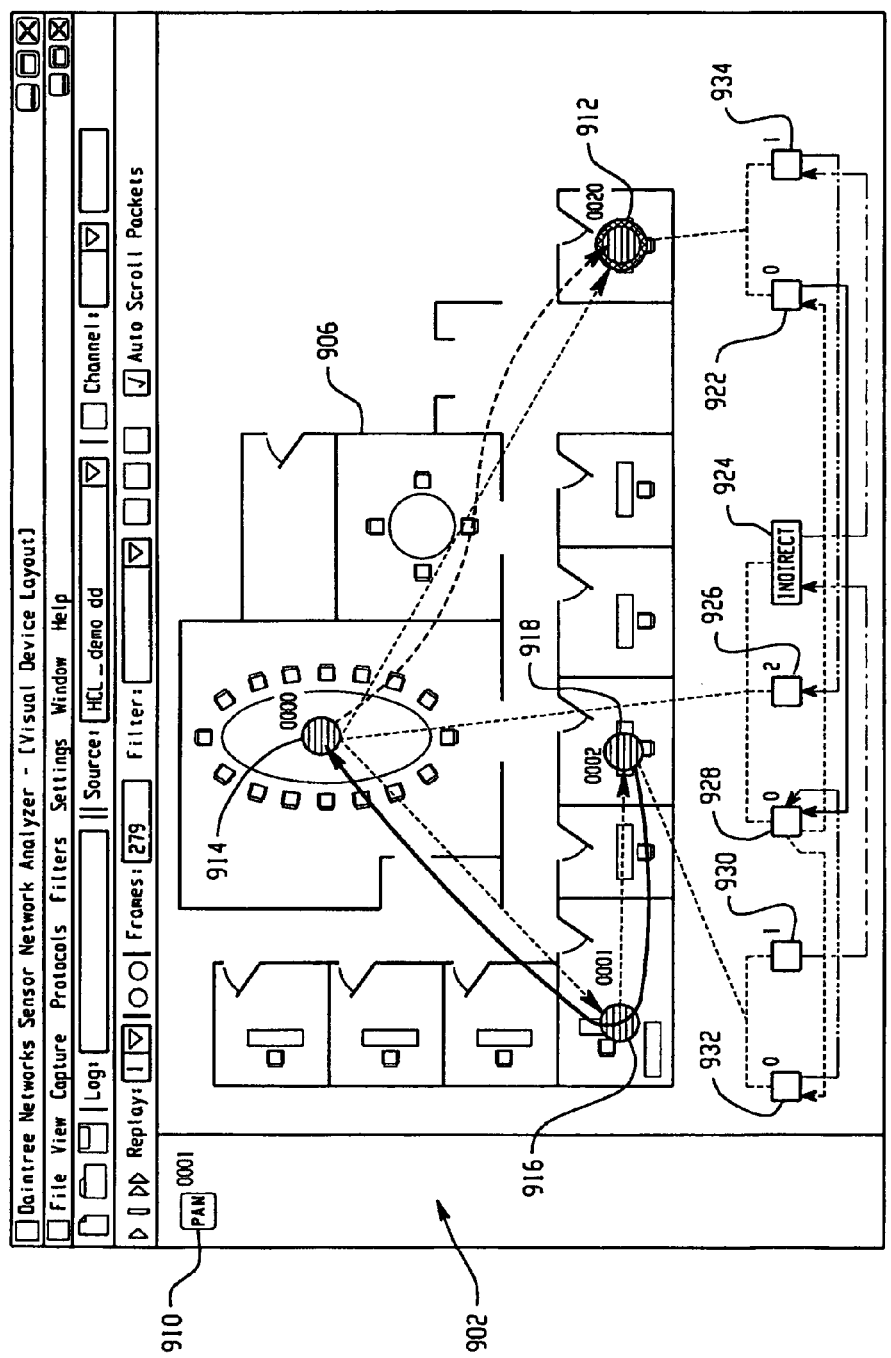
FIG. 51 is a visual device layout window showing associations, routes, endpoints and bindings.

FIG. 51 is the visual device layout window 900 showing associations, routes, endpoints and bindings. The physical deployment of the network corresponding to the PAN object 910 is thus represented by the device objects 912, 914, 916 and 918. Endpoint bindings 922, 924, 926, 928, 930, 932 and 934 are also displayed, as are associations, routes and binding lines. The association, route and binding lines may be selectively displayed to reduce clutter.

Figure 52:
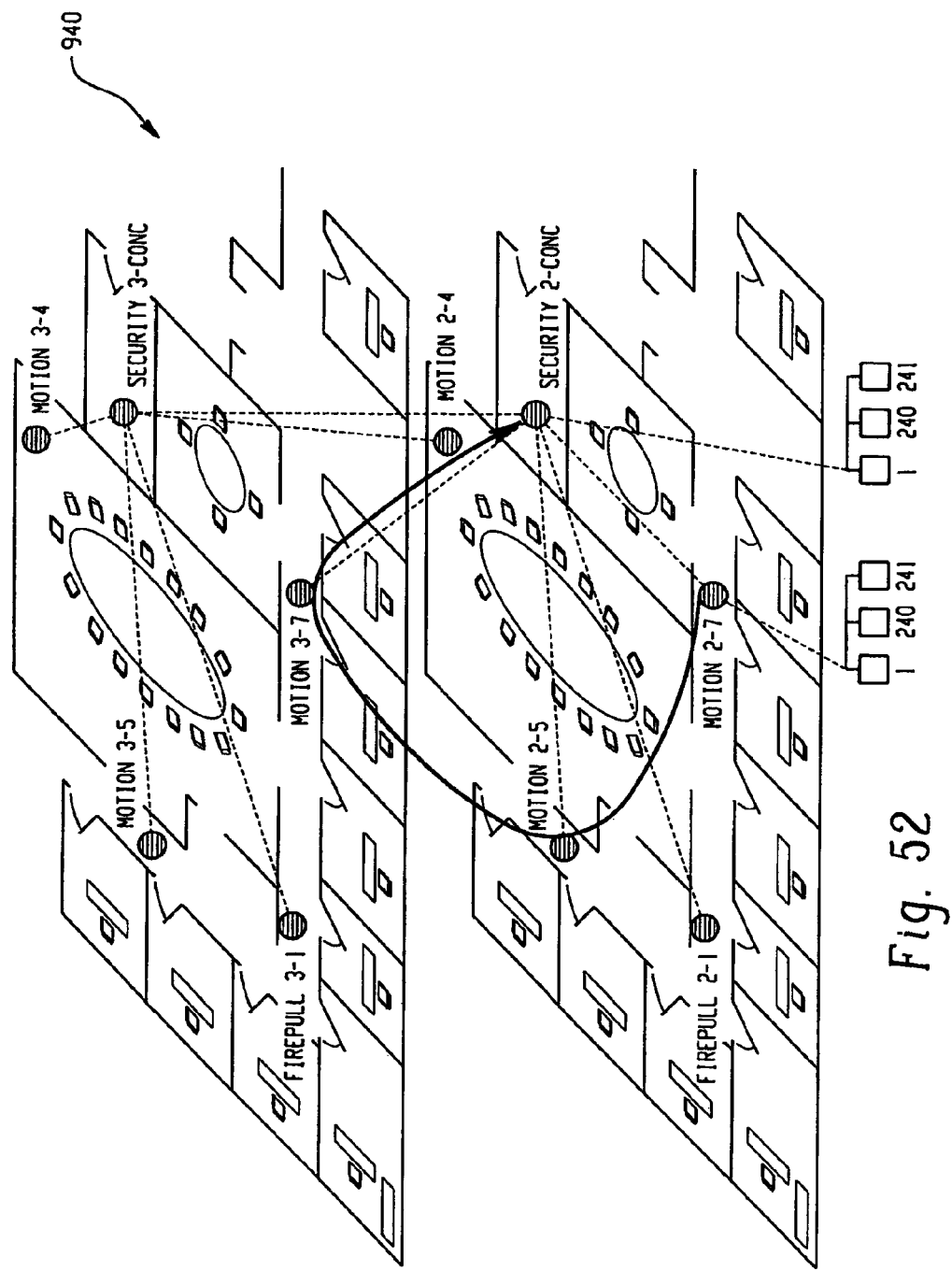
FIG. 52 is an example visual device layout window showing a network topology in three dimensions.

Although FIGS. 50 and 51 depict a two-dimensional representation, three-dimensional representations may also be used. A three-dimensional representation may be used to visually represent a network deployed on two or more floors, or in a large space such as a warehouse. FIG. 52 depicts an example three-dimensional representation 940.

Figure 53:
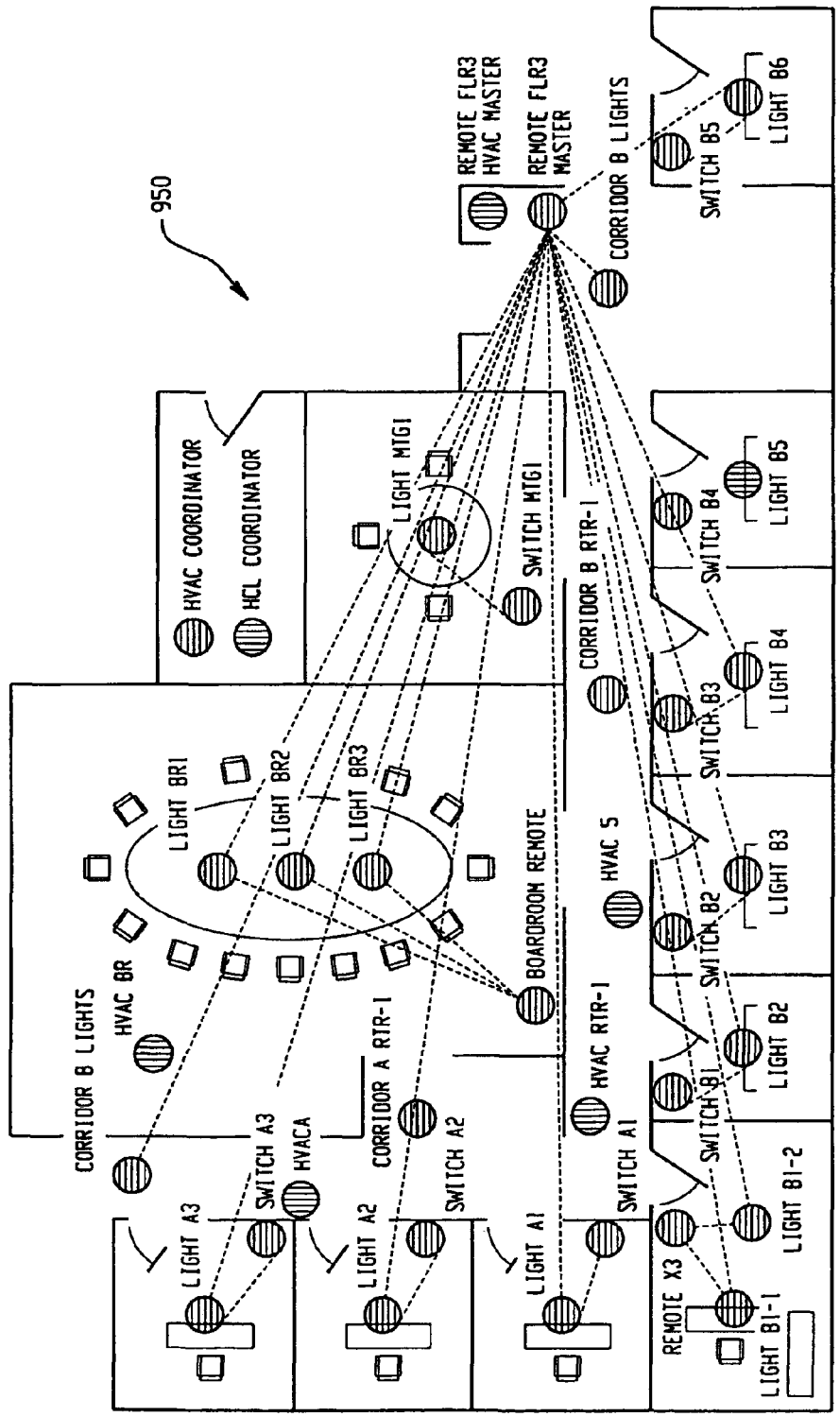
FIG. 53 is an example visual device layout window showing a network topology having endpoints that are visually represented as intrinsic elements of network device objects.

In another embodiment, endpoints are visually represented as intrinsic elements of a network device object, and endpoint bindings are drawn between nodes. FIG. 53 is an example visual representation 950 of a network topology having endpoints that are visually represented as intrinsic elements of network device objects. A straight arrow is drawn between device objects to represent detected APS binding between the device objects. The arrow may be unidirectional when only an APS binding in one direction is detected, and may be bidirectional when an APS binding is detected in both directions. The intrinsic representation may also be used in rendering the visual representation of the network topology without reference to a visual device layout.

The steps and the order of the steps in the methods and flowcharts described herein may be altered, modified and/or augmented and still achieve the desired outcome. Additionally, the methods, flow diagrams and structure block diagrams described herein may be implemented in the example processing devices described herein by program code comprising program instructions that are executable by the device processing subsystem. Other implementations may also be used, however, such as firmware or even appropriately designed hardware configured to carry out the methods and flow diagrams or implement the structure block diagrams described herein. Additionally, the methods, flow diagrams and structure block diagrams that describe particular methods and/or corresponding acts in support of steps and corresponding functions in support of disclosed software structures may also be implemented in software stored in a computer readable medium and equivalents thereof. The software structures may comprise source code, object code, machine code, or any other persistently or temporarily stored code that is operable to cause one or more processing systems to perform the methods described herein or realize the structures described herein.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A packet-based network analysis system for analyzing packet flow among devices in a wireless network, comprising:
  a wireless network analysis processing device configured to:
    receive a plurality of correlated packet records, the correlated packet records representative of an order in which corresponding packets were transmitted in the network and including media access control (MAC) layer data, application (APS) layer data, and network layer data for each corresponding packet;
    process the MAC layer data and network layer data to generate network topology data representative of the network topology, generate packet flow data representative of the flow of packets between devices at the MAC layer and across the network at the network layer, and generate measurement data relating to the packet flow data;
    process the APS layer data to generate endpoint data and binding data, the endpoint data identifying source endpoints and destination endpoints identified by the correlated packet records and associating each respective source endpoint and destination endpoint with a corresponding device in the network and a corresponding application layer functionality, and the binding data defining a logical link between a source endpoint and cluster identifier and a destination endpoint;
  a plurality of capture devices configured to monitor packets communicated over the network and create corresponding packet records, and wherein each capture device includes a capture clock and each capture device is further configured to include a timestamp in each packet record corresponding to a capture clock time the capture device detects the start of frame of a packet; and
  a correlator processor configured to:
    receive packet records corresponding to packets communicated over the network and store the packet records in a data store;
    timestamp synchronize the packet records stored in the data store with received packet records by designating a first capture device as a master capture device;
    identify duplicate records for packets communicated over the network by other capture devices, each other capture device being different from the master capture device and each duplicate record being record of a packet communicated over the network received from one of the other capture devices for which there is also a record of the same packet being communicated over the network received from the master capture device;
    determine a timing offset between the master capture device and at least one of the other capture devices based at least in part on a time difference between a time a particular packet was received by the master capture device as specified in a first packet record and a time the particular packet was received by the at least one of the other capture devices as specified in a duplicate record of the first packet record;
    time synchronize one or more packet records received from the at least one of the other capture devices to the master capture device based at least in part on the timing offset; and
    generate the correlated packet records from the packet records stored in the data store, the correlated packet records comprising hop data and timing data representative of a packet path and packet transmission times in the network for each corresponding packet, the correlated packet records filtered of packet records for duplicate packet transmissions and packet retransmissions.

2. The packet-based network analysis system of claim 1, wherein:
  the wireless network analysis processing device is configured to:
  identify packet streams based on a source network layer address and a destination network layer address.

3. The packet-based network analysis system of claim 2, wherein:
  the wireless network analysis processing device is configured to:
  compare a source MAC address and a destination MAC address to the source network layer address and the destination network layer address to generate packet flow data for the packet streams.

4. The packet-based network analysis system of claim 1, wherein:
  the packet flow data comprises packet flow records, and the wireless network analysis processing device is configured to:
  generate packet flow records with packet flow data specifying one or more hops of a packet in the network based at least in part on comparisons of a source MAC address for the packet and one or more of a source network address and a destination network address in a corresponding correlated packet record.

5. The packet-based network analysis system of claim 1, wherein the network comprises a ZigBee network.

6. A computer-implemented method for analyzing packet flow among devices in a wireless mesh network, comprising:
  receiving packet records corresponding to packets communicated over the network and store the packet records in a data store;
  monitoring, by capture devices each including a capture clock, packets communicated over the network, creating corresponding packet records, and including a timestamp in each packet record corresponding to a capture clock time the capture device detects the start of frame of a packet;
  timestamp synchronizing the packet records stored in the data store with received packet records by designating a first capture device as a master capture device;
  identifying duplicate records for packets communicated over the network by other capture devices, each other capture device being different from the master capture device and each duplicate record being record of a packet communicated over the network received from one of the other capture devices for which there is also a record of the same packet being communicated over the network received from the master capture device;
  determining a timing offset between the master capture device and at least one of the other capture devices based at least in part on a time difference between a time a particular packet was received by the master capture device as specified in a first packet record and a time the particular packet was received by the at least one of the other capture devices as specified in a duplicate record of the first packet record;
  time synchronizing one or more packet records received from the at least one of the other capture devices to the master capture device based at least in part on the timing offset;
  generating a plurality of correlated packet records from the packet records stored in the data store, the correlated packet records comprising hop data and timing data representative of a packet path and packet transmission times in the network for each corresponding packet, the correlated packet records filtered of packet records for duplicate packet transmissions and packet retransmissions and being representative of an order in which corresponding packets were transmitted in the network and including media access control (MAC) layer data, application layer data and network layer data for each corresponding packet;

generating network topology data representative of the network topology;

generating packet flow data representative of the flow of packets between devices at the MAC layer and across the network at the network layer;

generating application layer endpoint data identifying source endpoints and destination endpoints identified by the correlated packet records and associating each respective source endpoint and destination endpoint with a corresponding device in the network and a corresponding application layer functionality; and generating endpoint bindings data defining bindings between the source endpoints and the destination endpoints, each binding being a logical link between a source endpoint and cluster identifier and destination endpoint.

7. The method of claim 6, wherein:

generating network topology data representative of the network topology comprises:

identifying new devices in the network from packets in the correlated packet records related to an association request; and associating the new devices with the network topology according to a device association established by the association request.

8. The method of claim 7, wherein:

generating packet flow data representative of the flow of packets between devices at the MAC layer and across the network at the network layer comprises:

identifying packet streams based on a source network layer address and a destination network layer address; and detecting packet flow path of packets through the network for each stream.

9. The method of claim 7, wherein:

generating endpoint bindings data for endpoints between the source endpoints and the destination endpoints comprises:

generating direct bindings data related to direct bindings, the direct bindings based on packets transmitted between devices associated with source endpoint addresses and destination endpoint addresses; and generating indirect bindings data related to indirect bindings, the indirect bindings based on packets transmitted from a source endpoint to a coordinator device, wherein the packets do not specify a destination for the packet, and the coordinator device stores a binding table defining associations of devices associated with source endpoint addresses and destination endpoint addresses.

10. A packet-based network analysis device for analyzing packet flow among devices in a wireless network, comprising:

means for receiving packet records corresponding to packets communicated over the network and store the packet records in a data store;

means for monitoring packets communicated over the network, for creating corresponding packet records, and for including a timestamp in each packet record corresponding to a capture clock time a capture device detects the start of frame of a packet;

means for timestamp synchronizing the packet records stored in the data store with received packet records by designating a first capture device as a master capture device;

means for identifying duplicate records for packets communicated over the network by other capture devices, each other capture device being different from the master capture device and each duplicate record being record of a packet communicated over the network received from one of the other capture devices for which there is also a record of the same packet being communicated over the network received from the master capture device;

means for determining a timing offset between the master capture device and at least one of the other capture devices based at least in part on a time difference between a time a particular packet was received by the master capture device as specified in a first packet record and a time the particular packet was received by the at least one of the other capture devices as specified in a duplicate record of the first packet record;

means for time synchronizing one or more packet records received from the at least one of the other capture devices to the master capture device based at least in part on the timing offset;

means for generating a plurality of correlated packet records from the packet records stored in the data store, the correlated packet records comprising hop data and timing data representative of a packet path and packet transmission times in the network for each corresponding packet, the correlated packet records filtered of packet records for duplicate packet transmissions and packet retransmissions and being representative of an order in which corresponding packets were transmitted in the network and including media access control (MAC) layer data and network layer data for each corresponding packet;

means for generating network topology data representative of the network topology;

means for generating packet flow data representative of the flow of packets between devices at the MAC layer and across the network at the network layer;

means for generating measurement data relating to the packet flow data;

means for generating application layer endpoint data identifying source endpoints and destination endpoints identified by the correlated packet records and associating each respective source endpoint and destination endpoint with a corresponding device in the network and a correspond application layer functionality; and means for generating endpoint bindings between the source endpoints and the destination endpoints, each binding being a logical link between a source endpoint and cluster identifier and destination endpoint.

11. The packet-based network analysis system of claim 1, wherein the cluster identifier identifies a cluster specifying a set of messages, between the source endpoint and the destination endpoint, supported by an application profile for the application layer functionality.

12. The packet-based network analysis system of claim 1, wherein:

each duplicate packet transmission is a transmission of a packet over the network for which a first packet record specifying the transmission is received from a first capture device and for which a second packet record specifying the transmission is received from a second capture device; and each retransmission is a transmission of a packet over the network by a first network device that is subsequent to an earlier transmission of the packet by the first network device.

\* \* \* \* \*